(12) United States Patent
Shirota

(10) Patent No.: US 7,593,168 B2
(45) Date of Patent: Sep. 22, 2009

(54) ZOOM LENS AND IMAGING APPARATUS USING THE SAME

(75) Inventor: Eiji Shirota, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 11 days.

(21) Appl. No.: 11/985,817

(22) Filed: Nov. 16, 2007

(65) Prior Publication Data
US 2008/0143867 A1 Jun. 19, 2008

(30) Foreign Application Priority Data
Nov. 20, 2006 (JP) .............................. 2006-312712

(51) Int. Cl.
*G02B 15/14* (2006.01)
(52) U.S. Cl. ...................... 359/684; 359/683; 359/678; 359/695
(58) Field of Classification Search ................. 359/682, 359/683, 676, 678, 695, 684; 348/347
See application file for complete search history.

(56) References Cited
U.S. PATENT DOCUMENTS
5,016,107 A * 5/1991 Sasson et al. ............ 348/231.1

6,259,508 B1 * 7/2001 Shigematsu ................. 355/53
2006/0279739 A1 * 12/2006 Yamanaka ................. 356/482

FOREIGN PATENT DOCUMENTS
JP 2005-195757 7/2005
JP 2006-209100 8/2006

* cited by examiner

*Primary Examiner*—Darryl J Collins
*Assistant Examiner*—Zachary Wilkes
(74) *Attorney, Agent, or Firm*—Kenyon & Kenyon LLP

(57) ABSTRACT

The present invention relates to a low-cost zoom lens which has high optical performance specifications such as a wide angle of view and a high zoom ratio of as high as 5, is extremely small in depth and ensures that the optical path of the optical system can easily be bent by a reflecting optical element. A zoom lens includes a first lens group G1 with a positive power, a second lens group G2 with a negative power, a third lens group G3 with a positive power, a fourth lens group G4 with a positive power, a fifth lens group G5 with a negative power, and a sixth lens group G6 with a positive power, wherein upon zooming from a wide-angle end to telephoto end, the first lens group G1 remains fixed relative to an image surface I and at least second and fourth lens groups G2 and G4 move, the first lens group G1 includes, in order from the object side, a negative lens, a reflecting optical element P for bending an optical path, and a positive lens, and conditional expression (1) is satisfied.

10 Claims, 17 Drawing Sheets

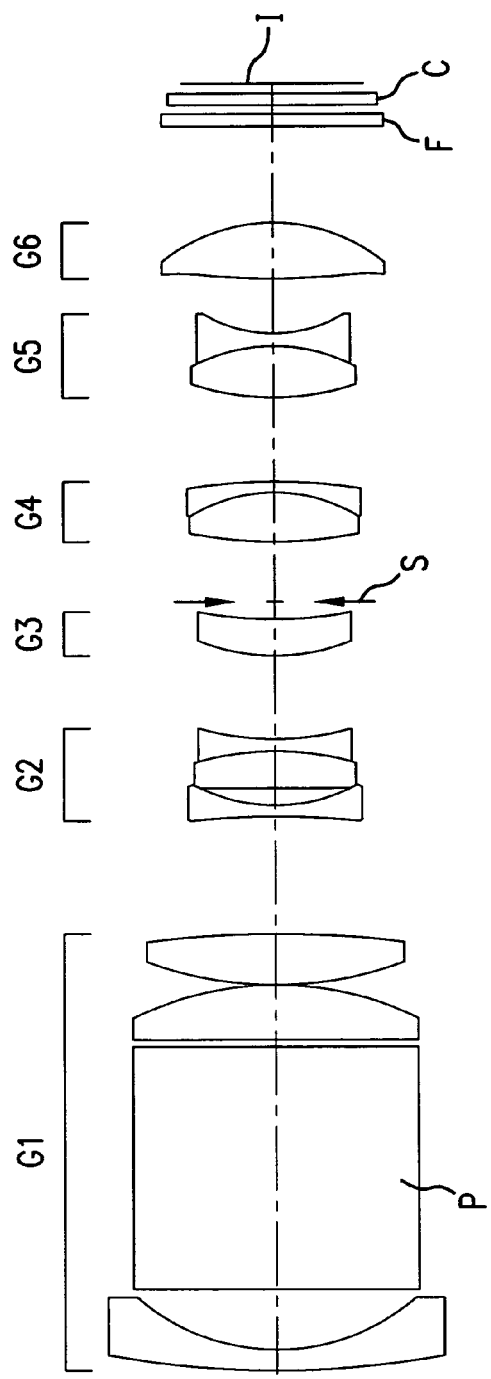
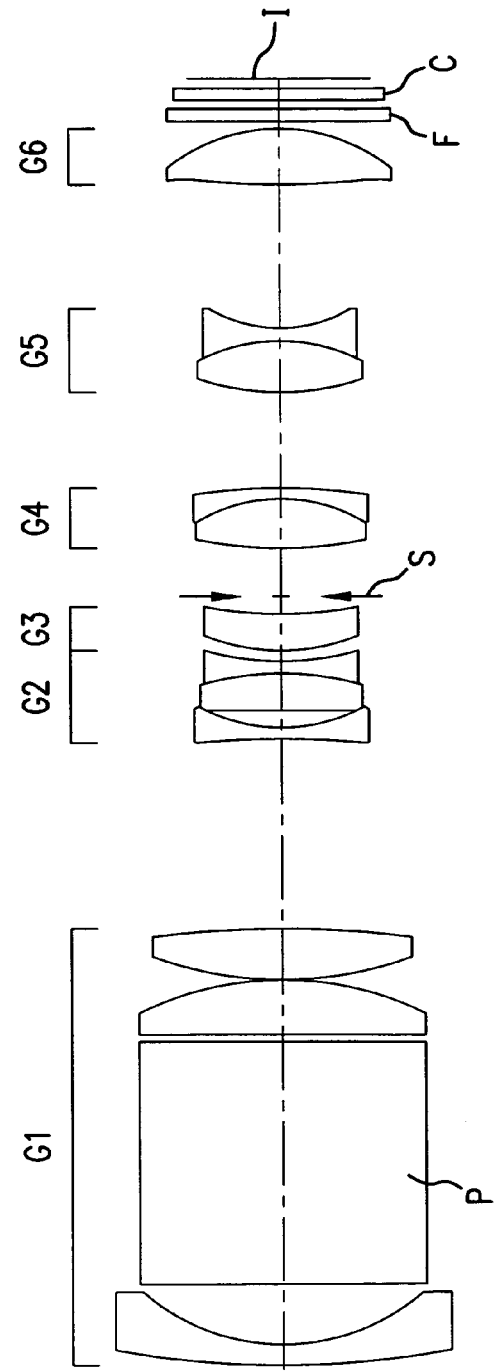
FIG.2B
FIG.2C

ZOOM LENS AND IMAGING APPARATUS USING THE SAME

CROSS REFERENCES TO RELATED APPLICATIONS

This application claims benefit of Japanese Application No. 2006-312712 filed in Japan on Nov. 20, 2006, the contents of which are incorporated by this reference.

BACKGROUND OF THE INVENTION

1. Field of the Invention

The present invention relates to a zoom lens and an imaging apparatus using the same and, more particularly, to a zoom lens having an optical system whose optical axis is bent and an imaging apparatus using the same.

2. Description of the Related Art

In recent years, digital cameras (electronic cameras) have received attention as the coming generation of cameras, an alternative to silver-halide 35 mm-film (usually called 135 format) cameras, and are now available in a wide spectrum of categories from commercial high-end to portable low-end types.

In view of the category of the portable low-end type in particular, the primary object of the present invention is to provide the technology for implementing, at low cost, video or digital cameras whose depth dimension is reduced while high image quality is ensured, easy to handle, and have a high zoom ratio capable of covering a wide focusing distance range from the wide-angle end to the telephoto end.

The greatest bottleneck in thinning down cameras in their depths direction is the thickness of the surface of an optical system, especially a zoom lens system, located nearest to its object side to an image pickup plane. The technology currently in vogue for thinning down camera bodies is the adoption of a collapsible lens barrel that allows an optical system protrudes from the front side of the camera body in photography and incorporated in the camera body when the camera is not used.

The adoption of the collapsible lens barrel, however, requires much time to bring lenses into a working state from an incorporating state, which is unfavorable for use. Furthermore, the design that the most object-side lens group is moved is unfavorable for water and dust proof. In recent years, in order to obtain a camera which does not have rising time (lens shifting time) required to bring the camera into the working state like the collapsible lens barrel, is favorable for water and dust proof, and is extremely small in depth, it is conceivable that the optical system is constructed so that the optical path (optical axis) is bent by a reflective optical component such as a mirror or prism. In the optical system used, the lens group nearest to the object side remains fixed in position, with a reflecting optical element located therein. An optical path portion following that lens group is bent in the longitudinal or transverse direction of a camera body, so that its depth dimension can be minimized.

In addition, in portable low-end type video and digital cameras on which the present invention has focused attention, ones having a half field angle of about 30° at the wide-angle end are mainstream. However, wide-angle video and digital cameras having a further enlarged photographing area are now expected.

As examples of a wide angle zoom lens adopting a bent optical system, there is known one disclosed in Patent Documents 1 and 2. However, a zoom lens of Patent Document 1 (JP-A-2004-354871) has a half field angle as large as about 37° while the zoom ratio thereof is not much more than about 2.8. Although a zoom lens of Patent Document 2 (JP-A-2004-354869) has a half field angle as large as about 37° and zoom ratio thereof is as large as about 3.7, the entire length of the zoom lens is long.

SUMMARY OF THE INVENTION

The present invention has been made in view of the above problems residing in the prior arts, and an object thereof is to provide a zoom lens enabling a camera to be immediately brought into a working state unlike a collapsible lens barrel camera which requires rising time (lens shifting time) to bring camera into the working state, making the camera preferable for water- and dust-proofing purposes, ensuring that the optical path (optical axis) of the optical system can easily be bent by a reflecting optical element such as a prism in order to achieve a reduction in the camera depth direction size, having high optical performance specifications such as a wide angle of view and a high zoom ratio of as high as 5, and being extremely small in depth.

To achieve the above object, according to the present invention, there is provided a zoom lens including, in order from the object side, a first lens group with a positive power, a second lens group with a negative power, a third lens group with a positive power, a fourth lens group with a positive power, a fifth lens group with a negative power, and a sixth lens group with a positive power, wherein upon zooming from a wide-angle end to telephoto end, the first lens group remains fixed relative to an image surface and at least second and fourth lens groups move, the first lens group includes, in order from the object side, a negative lens, a reflecting optical element for bending an optical path, and a positive lens, and the following conditional expression is satisfied:

$$1.0 < |f_{1L1}|/f_w < 2.5 \tag{1}$$

(where $f_{1L1}$ is focal length of the negative lens in the first lens group, and $f_w$ is focal length at the wide-angle end).

Reasons and advantages of the zoom lens constructed according to the present invention are now explained.

The optical path can be bent by the first lens group to thereby reducing the thickness in the depth direction of the zoom lens. By moving the second and fourth lens groups, load of zooming is shared by the second and fourth lens groups thereby achieving a high zoom ratio. The configuration in which the fifth lens group has a negative power to enlarge an image can shorten the focal length from the first to fourth lens groups, enabling a reduction in the thickness in the depth direction of the zoom lens. By using a positive lens as the sixth lens group, it is possible to easily ensure telecentricity. Further, substantial fixing of the first lens group relative to the image surface enables a camera to be immediately brought into a working state and makes the camera preferable for water- and dust-proofing purposes.

The conditional expression (1) adequately specifies the power of the negative lens in the first lens group. In order to physically achieve the bending of the optical path while making the entrance pupil position shallow, it is preferable to increase the power of the negative lens in the first lens group. When the upper limit 2.5 is exceeded, the entrance pupil position remains deep. When a certain degree of field angle is intended to be ensured in this state, the diameter or size of each optical element constituting the first lens group is increased to making it difficult to physically achieve the bending of the optical path. When the lower limit 1.0 is exceeded, the magnification that the lens groups subsequent to the first lens group and designed to move for zooming can have becomes close to zero, offering problems such as an increase in the amount of zooming movement or a zoom ratio drop and, at the same time, rendering correction of off-axis aberrations such as distortion and chromatic aberrations difficult.

Further, in the zoom lens constructed according to the present invention, it is preferable that the third lens group remain fixed upon zooming. By disposing an aperture stop near the fixed third lens group, a reduction in the lens diameter can be achieved.

Further, it is preferable that the first lens group include, in order from the object side, a negative lens, a prism, a positive lens, and a positive lens. By disposing a negative lens nearest the object side and bending the optical path by the subsequent element, the thickness of the camera can be reduced. Further, a use of the negative lens can reduce the length of the effective lens system and use of a prism as a reflecting optical element can keep the length of the optical path short to thereby shorten the interval between the first lens group and aperture stop, making the entrance pupil position shallow, with the result that size reduction can be achieved. Since the first lens group has a positive power, it is necessary to dispose a positive lens on the image side of the prism and, when the zoom ratio is increased, it becomes difficult to correct coma aberration generated in the positive lens. Therefore, by adding another positive lens to share the power, the aberration can satisfactorily be corrected.

Further, it is preferable for the lens system to satisfy the following conditional expression:

$$N_{dL1} > 1.94 \quad (2)$$

(where $N_{dL1}$ is refractive index of the negative lens in the first lens group).

When the power of the negative lens in the first lens group is increased for the purpose of making the entrance pupil position shallow, generation of the off-axis aberration cannot be suppressed. Thus, by setting the refractive index of the negative lens to the value specified in the above conditional expression, it is possible to suppress generation of aberration, as well as reduce the thickness in the optical axis direction of the zoom lens, resulting in a size reduction.

Further, it is necessary for the second lens group to have a strong negative power for size reduction, so that it is preferable that an aspheric surface be disposed for correcting spherical aberration and coma aberration.

Further, it is preferable for the second lens group includes, in order from the object side, a negative lens and a cemented lens component of positive and negative lenses so as to share a negative power between the second and fifth lens group and correct chromatic aberration by the cemented lens component of positive and negative lenses.

Further, it is preferable for the negative lens in the first lens group to have an aspheric surface. The ray height neighboring the negative lens in the first lens group is large when at the wide-angle end and therefore off-axis aberration is very likely to be generated. When the power of the negative lens in the first lens group is increased for the purpose of making the entrance pupil position shallow, aberration is very likely to be generated. In order to prevent this, it is preferable to dispose an aspheric surface for aberration correction. Further, by doing this, it is possible to weaken the curvature of the surface having the aspheric surface, suppressing performance degradation due to manufacturing error and contributing to a reduction in the thickness in the depth direction of the zoom lens.

The present invention includes an imaging apparatus using the zoom lens having the configuration described above and, in this case, it is preferable that a low pass filter be disposed between the zoom lens and an image sensor.

As described above, according to the present invention, there can be provided a zoom lens enabling a camera to be immediately brought into a working state unlike a collapsible lens barrel camera, making the camera preferable for water- and dust-proofing purposes, ensuring that the optical path (optical axis) of the optical system can easily be bent by a reflecting optical element such as a mirror or prism in order to achieve a reduction in the camera depth direction size, having high optical performance specifications such as a wide angle of view and a high zoom ratio of as high as 5, and being extremely small in depth.

Still other objects and advantages of the invention will in part be obvious and will in part be apparent from the specification.

The invention accordingly includes the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 2A, 2B, and 2C are sectional views of zoom lens according to Example 2 of the present invention, similar to FIGS. 1A to 1C;

DESCRIPTION OF EXEMPLARY EMBODIMENTS

Examples 1 to 3 of zoom lenses according to the present invention will be described. Sectional views of Examples 1 to 3 at the wide-angle end, in the intermediate state and at the telephoto end upon focused on an object point at infinity are shown in FIGS. 1 to 3. Throughout FIGS. 1 to 3, a first lens group is indicated by G1, a second lens group by G2, a third lens group by G3, an aperture stop by S, a fourth lens group by G4, a fifth lens group by G5, a sixth lens group by G6, an optical low-pass filter by F, a cover glass for an electronic image pickup device CCD by G, and an image plane of CCD by I. An optical path-bending prism which is disposed in the first lens group G1 and serves as a reflecting member is indicated by a plane-parallel plate P, and reflecting surface thereof is not shown. It is noted that instead of the near-infrared sharp cut coat, it is acceptable to use an optical low-pass filter F coated directly with a near-infrared sharp cut coat, an infrared cut absorption filter or a transparent plane plate with a near-infrared sharp cut coat applied on its entrance surface.

Figure 1A:
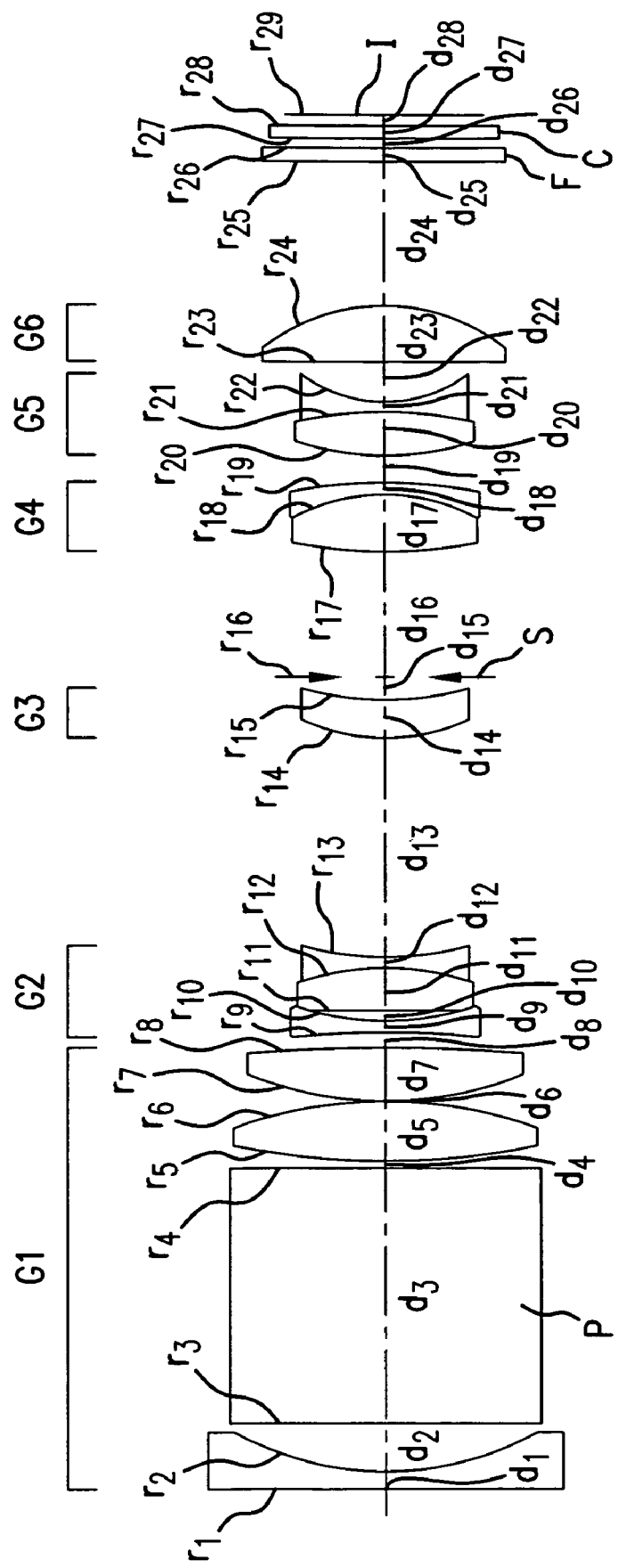
FIGS. 1A, 1B, and 1C are sectional views of zoom lens according to Example 1 of the present invention at the wide-angle end, in an intermediate state and at the telephoto end, respectively, when the zoom lens is focused on an object point at infinity.
Figure 1B:
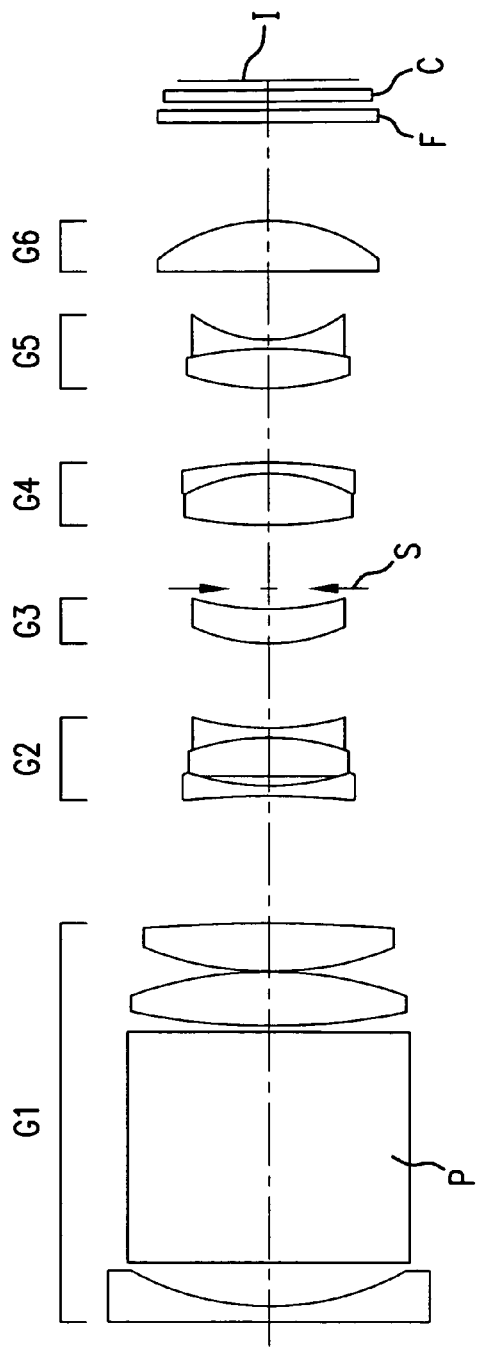
Figure 1C:
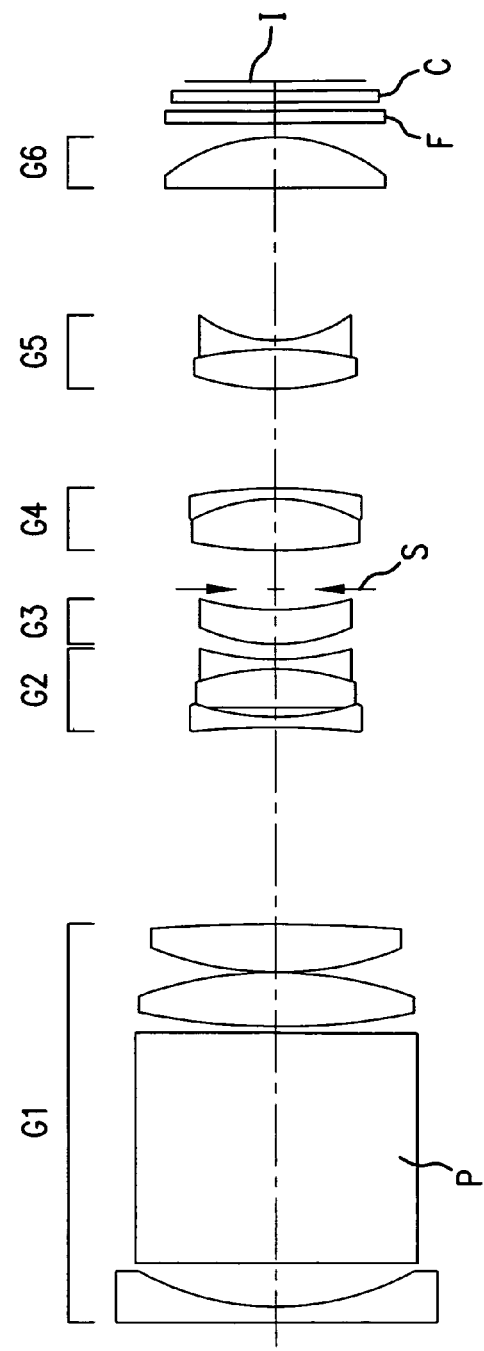

As shown in FIGS. 1A, 1B, and 1C, the zoom lens of Example 1 includes, in order from the object side, a first lens group G1 with a positive power, a second lens group G2 with a negative power, a third lens group G3 with a positive power, an aperture stop S disposed integrally with the third lens group G3, a fourth lens group G4 with a positive power, a fifth lens group G5 with a negative power, and a sixth lens group G6 with a positive power. Upon zooming from the wide-angle end to telephoto end, the first lens group G1 remains fixed, second lens group G2 moves toward the image side, third lens group G3 and aperture S remain fixed, fourth lens group G4 moves to the object side, fifth lens group G5 remains fixed, and sixth lens group G6 moves toward the image side. The optical path is bent by a prism P disposed in the first lens group G1.

The respective lens groups are configured as follows, in order from the object side: the first lens group G1 consists of a double concave negative lens, prism P, double convex positive lens, and double convex positive lens; second lens group G2 consists of a cemented lens component of a double concave negative lens, double convex positive lens, and double concave negative lens; third lens group G3 consists of one positive meniscus lens having a convex surface directed toward the object side; fourth lens group G4 consists of a cemented lens component of a double convex positive lens and negative meniscus lens having a concave surface directed toward the object side; fifth lens group G5 consists of a cemented lens component of a double convex positive lens and double concave negative lens; and sixth lens group G6 consists of one double convex positive lens.

The both sides of the double convex positive lens disposed on the image side of the prism in the first lens group G1, surface nearest to the image side of the cemented lens component in the second lens group G2, both surfaces of the positive meniscus lens in the third lens group G3, and both sides of the double convex positive lens in the sixth lens group G6 are aspheric.

Figure 2A:
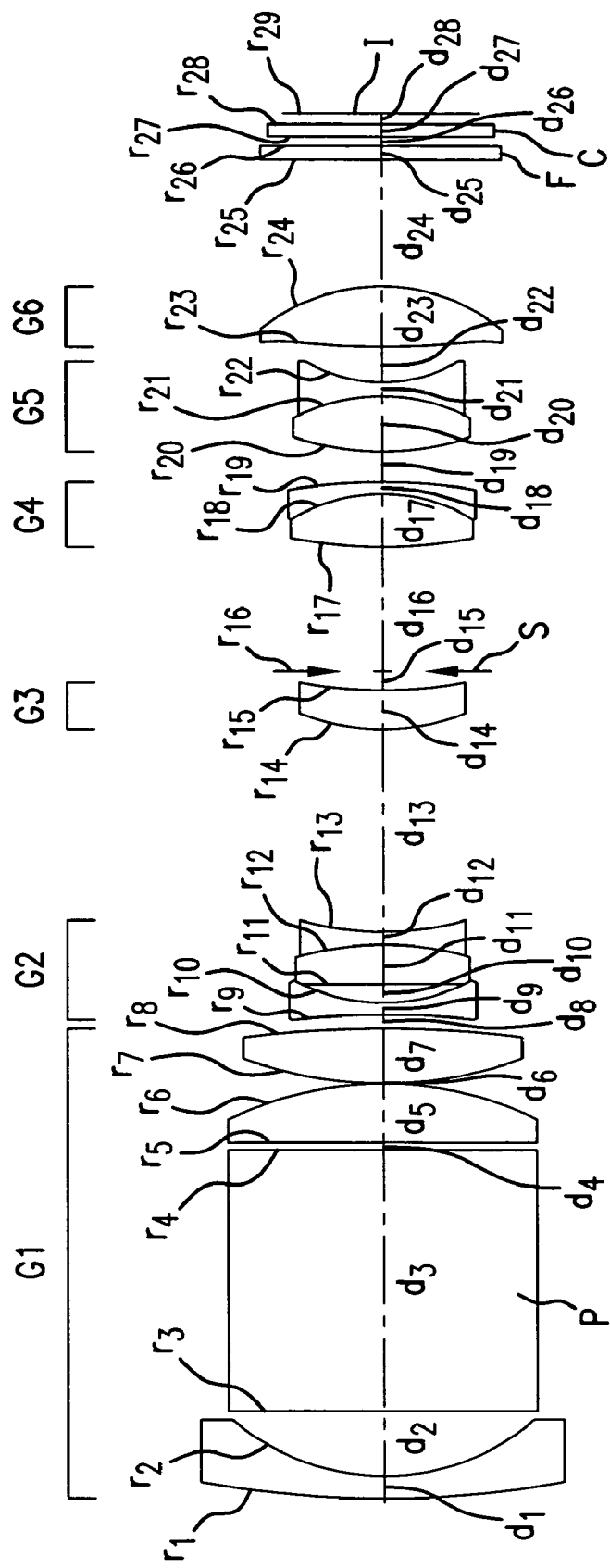

As shown in FIGS. 2A, 2B, and 2C, the zoom lens of Example 2 includes, in order from the object side, a first lens group G1 with a positive power, a second lens group G2 with a negative power, a third lens group G3 with a positive power, an aperture stop S disposed integrally with the third lens group G3, a fourth lens group G4 with a positive power, a fifth lens group G5 with a negative power, and a sixth lens group G6 with a positive power. Upon zooming from the wide-angle end to telephoto end, the first lens group G1 remains fixed, second lens group G2 moves toward the image side, third lens group G3 and aperture S remain fixed, fourth lens group G4 moves to the object side, fifth lens group G5 remains fixed, and sixth lens group G6 moves toward the image side. The optical path is bent by a prism P disposed in the first lens group G1.

The respective lens groups are configured as follows, in order from the object side: the first lens group G1 consists of a negative meniscus lens having a convex surface directed toward the object side, prism P, double convex positive lens, and double convex positive lens; second lens group G2 consists of a cemented lens component of a double concave negative lens, double convex positive lens, and double concave negative lens; third lens group G3 consists of one positive meniscus lens having a convex surface directed toward the object side; fourth lens group G4 consists of a cemented lens component of a double convex positive lens and negative meniscus lens having a concave surface directed toward the object side; fifth lens group G5 consists of a cemented lens component of a double convex positive lens and double concave negative lens; and sixth lens group G6 consists of one double convex positive lens.

The both sides of the double convex positive lens disposed on the image side of the prism in the first lens group G1, surface nearest to the image side of the cemented lens component in the second lens group G2, both surfaces of the positive meniscus lens in the third lens group G3, and both sides of the double convex positive lens in the sixth lens group G6 are aspheric.

Figure 3A:
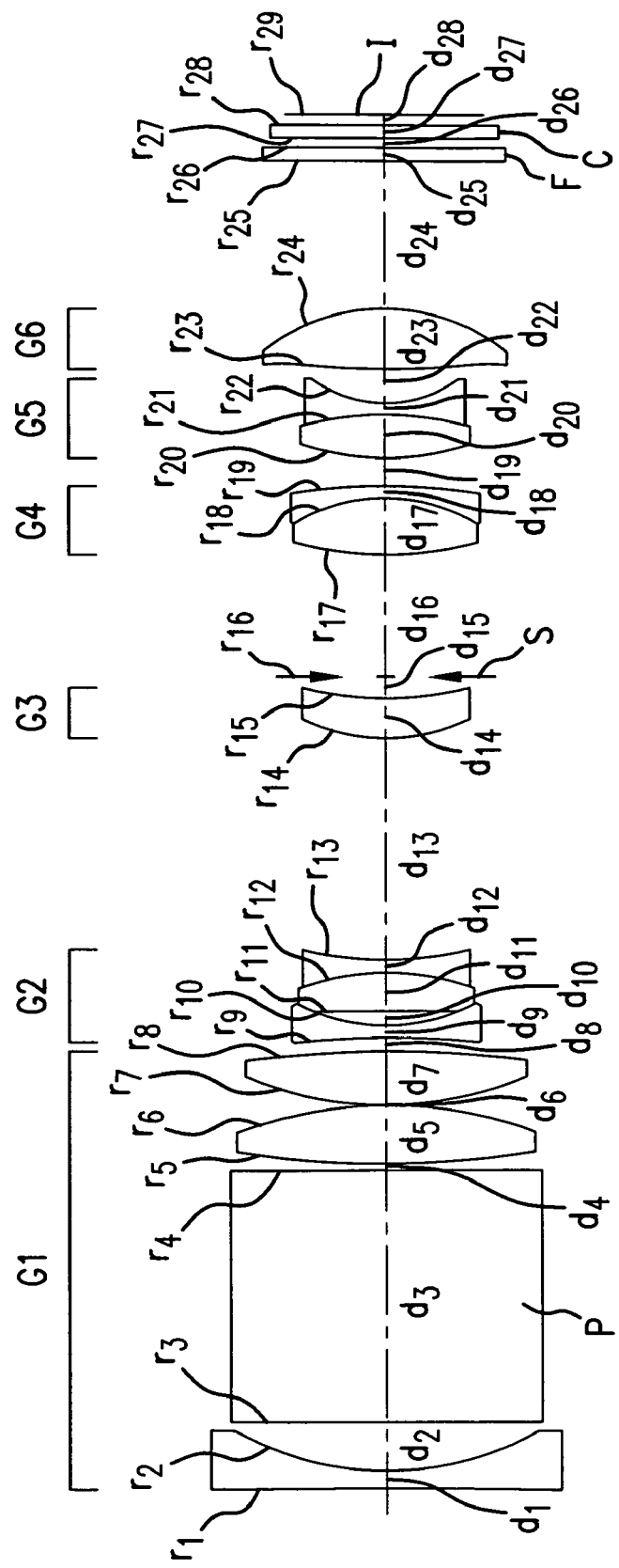
FIGS. 3A, 3B, and 3C are sectional views of zoom lens according to Example 3 of the present invention, similar to FIGS. 1A to 1C.
Figure 3B:
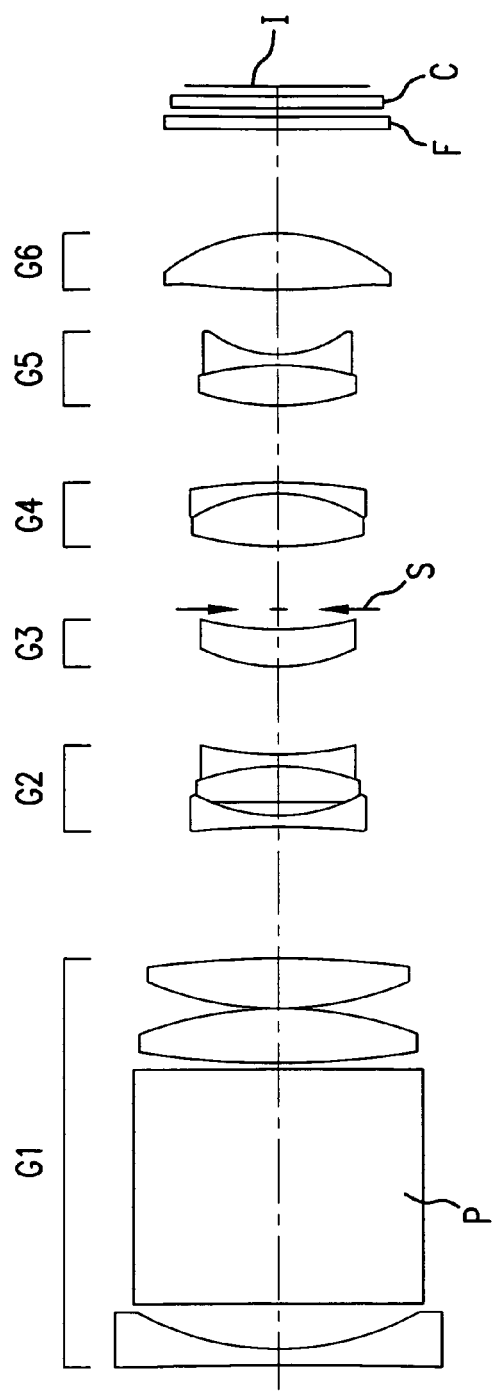
Figure 3C:
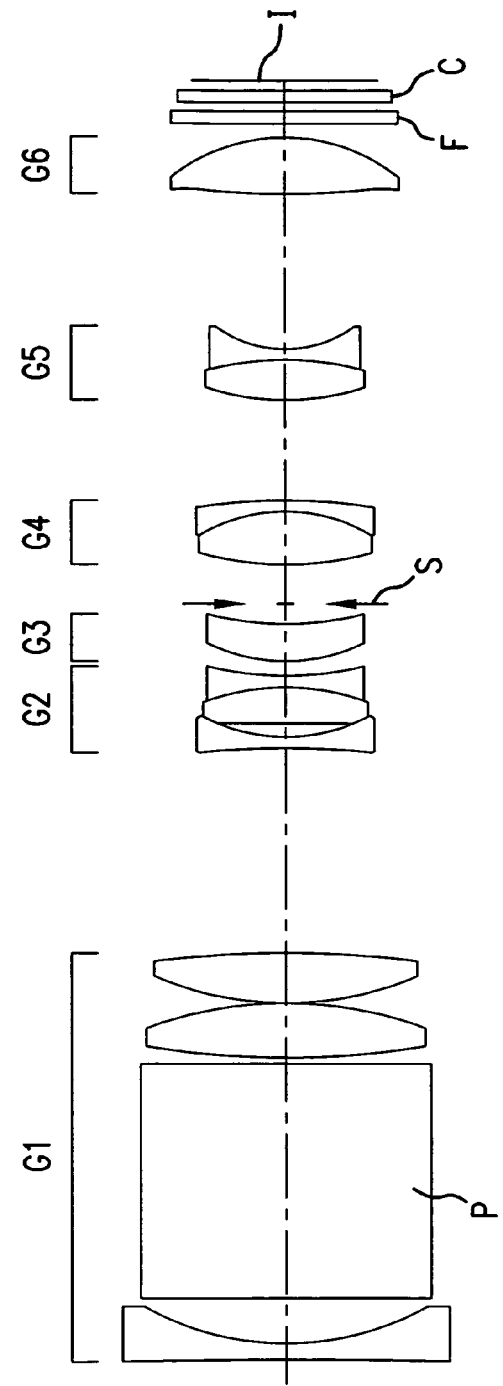

As shown in FIGS. 3A, 3B, and 3C, the zoom lens of Example 3 includes, in order from the object side, a first lens group G1 with a positive power, a second lens group G2 with a negative power, a third lens group G3 with a positive power, an aperture stop S disposed integrally with the third lens group G3, a fourth lens group G4 with a positive power, a fifth lens group G5 with a negative power, and a sixth lens group G6 with a positive power. Upon zooming from the wide-angle end to telephoto end, the first lens group G1 remains fixed, second lens group G2 moves toward the image side, third lens group G3 and aperture S remain fixed, fourth lens group G4 moves to the object side, fifth lens group G5 remains fixed, and sixth lens group G6 moves toward the image side. The optical path is bent by a prism P disposed in the first lens group G1.

The respective lens groups are configured as follows, in order from the object side: the first lens group G1 consists of a double concave negative lens, prism P, double convex positive lens, and double convex positive lens; second lens group G2 consists of a cemented lens component of a double concave negative lens, double convex positive lens, and double concave negative lens; third lens group G3 consists of one positive meniscus lens having a convex surface directed toward the object side; fourth lens group G4 consists of a cemented lens component of a double convex positive lens and negative meniscus lens having a concave surface directed toward the object side; fifth lens group G5 consists of a cemented lens component of a double convex positive lens and double concave negative lens; and sixth lens group G6 consists of one double convex positive lens.

The both sides of the double convex positive lens disposed on the image side of the prism in the first lens group G1, surface nearest to the image side of the cemented lens component in the second lens group G2, both surfaces of the positive meniscus lens in the third lens group G3, and both sides of the double convex positive lens in the sixth lens group G6 are aspheric.

The numerical data on respective examples are given below. Symbols used hereinafter but not hereinbefore have the following meanings: f denotes focal length of the entire zoom lens system; $F_{NO}$ denotes F-number; $2\omega$ denotes whole field angle; WE denotes wide-angle end; ST denotes intermediate state; TE denotes telephoto end; $r_1, r_2, \ldots$ denote radius of curvature of each lens surface, $d_1, d_2, \ldots$ denote spacing between the adjacent lens surfaces; $n_{d1}, n_{d2}, \ldots$ denote d-line refractive index of each lens, $\nu_{d1}, \nu_{d2} \ldots$ denote Abbe number of each lens. Here let x be an optical axis on condition that the direction of propagation of light is positive and y be a direction perpendicular to the optical axis. Then, aspheric configuration is given by the following expression:

$$x=(y^2/r)/[1+\{1-(K+1)(y/r)^2\}^{1/2}]+A_4y^4+A_6y^6+A_8y^8+A_{10}y^{10}$$

(where r is a paraxial radius of curvature, K is a conical coefficient, and $A_4$, $A_6$, $A_8$, and $A_{10}$ are the fourth, sixth, eighth and tenth aspheric coefficients, respectively).

EXAMPLE 1

| | | | |
|---|---|---|---|
| $r_1 = -255.695$ | $d_1 = 0.80$ | $n_{d1} = 2.00069$ | $\nu_{d1} = 25.46$ |
| $r_2 = 12.002$ | $d_2 = 2.11$ | | |
| $r_3 = \infty$ | $d_3 = 11.00$ | $n_{d2} = 1.84666$ | $\nu_{d2} = 23.78$ |
| $r_4 = \infty$ | $d_4 = 0.20$ | | |
| $r_5 = 37.472$ (Aspheric) | $d_5 = 2.5$ | $n_{d3} = 1.58913$ | $\nu_{d3} = 61.25$ |
| $r_6 = -17.743$ (Aspheric) | $d_6 = 0.10$ | | |
| $r_7 = 16.458$ | $d_7 = 2.28$ | $n_{d4} = 1.60300$ | $\nu_{d4} = 65.44$ |
| $r_8 = -65.216$ | $d_8 =$ (variable) | | |
| $r_9 = -31.587$ | $d_9 = 0.50$ | $n_{d5} = 1.88300$ | $\nu_{d5} = 40.76$ |
| $r_{10} = 10.789$ | $d_{10} = 0.50$ | | |
| $r_{11} = 56.301$ | $d_{11} = 1.78$ | $n_{d6} = 1.92286$ | $\nu_{d6} = 20.88$ |
| $r_{12} = -9.569$ | $d_{12} = 0.50$ | $n_{d7} = 1.86400$ | $\nu_{d7} = 40.60$ |
| $r_{13} = 13.195$ (Aspheric) | $d_{13} =$ (variable) | | |
| $r_{14} = 9.664$ (Aspheric) | $d_{14} = 1.7$ | $n_{d8} = 1.77377$ | $\nu_{d8} = 47.17$ |
| $r_{15} = 68.098$ (Aspheric) | $d_{15} = 0.90$ | | |
| $r_{16} = \infty$ (Stop) | $d_{16} =$ (variable) | | |
| $r_{17} = 17.931$ | $d_{17} = 2.39$ | $n_{d9} = 1.77250$ | $\nu_{d9} = 49.60$ |
| $r_{18} = -7.812$ | $d_{18} = 0.50$ | $n_{d10} = 1.84666$ | $\nu_{d10} = 23.78$ |
| $r_{19} = -21.300$ | $d_{19} =$ (variable) | | |
| $r_{20} = 10.715$ | $d_{20} = 1.93$ | $n_{d11} = 1.61800$ | $\nu_{d11} = 63.33$ |
| $r_{21} = -14.315$ | $d_{21} = 0.48$ | $n_{d12} = 1.90366$ | $\nu_{d12} = 31.31$ |
| $r_{22} = 5.573$ | $d_{22} =$ (variable) | | |
| $r_{23} = 71.568$ (Aspheric) | $d_{23} = 2.49$ | $n_{d13} = 1.58913$ | $\nu_{d13} = 61.25$ |
| $r_{24} = -8.462$ (Aspheric) | $d_{24} =$ (variable) | | |
| $r_{25} = \infty$ | $d_{25} = 0.50$ | $n_{d14} = 1.51633$ | $\nu_{d14} = 64.14$ |
| $r_{26} = \infty$ | $d_{26} = 0.50$ | | |
| $r_{27} = \infty$ | $d_{27} = 0.50$ | $n_{d15} = 1.51633$ | $\nu_{d15} = 64.1$ |
| $r_{28} = \infty$ | $d_{28} = 0.39$ | | |
| $r_{29} = \infty$ (Image Plane) | | | |

Aspherical Coefficients

5th surface $K = 0.000$
$A_4 = -3.53167 \times 10^{-5}$
$A_6 = 6.73299 \times 10^{-8}$
$A_8 = -1.48711 \times 10^{-8}$
$A_{10} = 3.66378 \times 10^{-10}$ 6th surface $K = 0.000$
$A_4 = -5.25033 \times 10^{-6}$
$A_6 = 2.18132 \times 10^{-8}$
$A_8 = -1.66552 \times 10^{-8}$
$A_{10} = 3.55386 \times 10^{-10}$ 13th surface $K = 0.000$
$A_4 = -3.30840 \times 10^{-4}$
$A_6 = 7.90045 \times 10^{-6}$
$A_8 = -5.61066 \times 10^{-7}$
$A_{10} = 0$ 14th surface $K = 0.000$
$A_4 = 7.80751 \times 10^{-4}$
$A_6 = 4.28306 \times 10^{-5}$
$A_8 = -1.36643 \times 10^{-6}$
$A_{10} = 1.90915 \times 10^{-7}$ 15th surface $K = 0.000$
$A_4 = 1.19333 \times 10^{-3}$
$A_6 = 5.88925 \times 10^{-5}$
$A_8 = -2.63057 \times 10^{-6}$
$A_{10} = 4.53565 \times 10^{-7}$ 23th surface $K = 0.000$
$A_4 = 3.41413 \times 10^{-5}$
$A_6 = 5.09238 \times 10^{-6}$
$A_8 = 5.29029 \times 10^{-7}$
$A_{10} = -3.81169 \times 10^{-8}$ 24th surface $K = 0.000$
$A_4 = 1.32425 \times 10^{-4}$
$A_6 = -1.33316 \times 10^{-6}$
$A_8 = -3.82571 \times 10^{-7}$
$A_{10} = 0$

Zoom data ($\infty$)

| | WE | ST | TE |
|---|---|---|---|
| f (mm) | 5.07 | 11.09 | 24.36 |
| $F_{NO}$ | 3.57 | 3.98 | 5.10 |
| $2\omega$ (°) | 81.89 | 37.50 | 18.28 |
| $d_8$ | 0.62 | 5.85 | 9.34 |
| $d_{13}$ | 9.22 | 3.99 | 0.50 |
| $d_{16}$ | 5.48 | 2.95 | 2.00 |
| $d_{19}$ | 1.20 | 3.73 | 4.67 |
| $d_{22}$ | 1.50 | 2.87 | 7.13 |
| $d_{24}$ | 6.20 | 4.85 | 0.59 |

EXAMPLE 2

| | | | |
|---|---|---|---|
| $r_1 = 54.253$ | $d_1 = 0.80$ | $n_{d1} = 2.00069$ | $\nu_{d1} = 25.46$ |
| $r_2 = 9.487$ (Aspheric) | $d_2 = 2.94$ | | |
| $r_3 = \infty$ | $d_3 = 11.19$ | $n_{d2} = 1.90366$ | $\nu_{d2} = 31.31$ |
| $r_4 = \infty$ | $d_4 = 0.20$ | | |
| $r_5 = 101.594$ (Aspheric) | $d_5 = 2.50$ | $n_{d3} = 1.58913$ | $\nu_{d3} = 61.25$ |
| $r_6 = -14.196$ (Aspheric) | $d_6 = 0.10$ | | |
| $r_7 = 16.032$ | $d_7 = 2.29$ | $n_{d4} = 1.60300$ | $\nu_{d4} = 65.44$ |
| $r_8 = -50.375$ | $d_8 =$ (variable) | | |
| $r_9 = -22.744$ | $d_9 = 0.50$ | $n_{d5} = 1.88300$ | $\nu_{d5} = 40.76$ |
| $r_{10} = 7.719$ | $d_{10} = 0.47$ | | |
| $r_{11} = 14.464$ | $d_{11} = 2.00$ | $n_{d6} = 1.92286$ | $\nu_{d6} = 20.88$ |
| $r_{12} = -12.450$ | $d_{12} = 0.50$ | $n_{d7} = 1.86400$ | $\nu_{d7} = 40.60$ |
| $r_{13} = 10.203$ (Aspheric) | $d_{13} =$ (variable) | | |
| $r_{14} = 9.712$ (Aspheric) | $d_{14} = 1.70$ | $n_{d8} = 1.77377$ | $\nu_{d8} = 47.17$ |
| $r_{15} = -403.924$ (Aspheric) | $d_{15} = 0.90$ | | |
| $r_{16} = \infty$ (Stop) | $d_{16} =$ (variable) | | |
| $r_{17} = 18.458$ | $d_{17} = 2.42$ | $n_{d9} = 1.77250$ | $\nu_{d9} = 49.60$ |

-continued

| | | | |
|---|---|---|---|
| $r_{18} = -6.536$ | $d_{18} = 0.50$ | $n_{d10} = 1.84666$ | $\nu_{d10} = 23.78$ |
| $r_{19} = -22.819$ | $d_{19} = $ (variable) | | |
| $r_{20} = 14.335$ | $d_{20} = 2.44$ | $n_{d11} = 1.61800$ | $\nu_{d11} = 63.33$ |
| $r_{21} = -6.682$ | $d_{21} = 0.48$ | $n_{d12} = 1.90366$ | $\nu_{d12} = 31.31$ |
| $r_{22} = 6.468$ | $d_{22} = $ (variable) | | |
| $r_{23} = 60.124$ (Aspheric) | $d_{23} = 2.57$ | $n_{d13} = 1.58913$ | $\nu_{d13} = 61.25$ |
| $r_{24} = -7.735$ (Aspheric) | $d_{24} = $ (variable) | | |
| $r_{25} = \infty$ | $d_{25} = 0.50$ | $n_{d14} = 1.51633$ | $\nu_{d14} = 64.14$ |
| $r_{26} = \infty$ | $d_{26} = 0.50$ | | |
| $r_{27} = \infty$ | $d_{27} = 0.50$ | $n_{d15} = 1.51633$ | $\nu_{d15} = 64.14$ |
| $r_{28} = \infty$ | $d_{28} = 0.39$ | | |
| $r_{29} = \infty$ (Image Plane) | | | |

Aspherical Coefficients

2th surface $K = 0.000$
$A_4 = 4.61666 \times 10^{-5}$
$A_6 = 3.32247 \times 10^{-7}$
$A_8 = 4.87992 \times 10^{-8}$
$A_{10} = 0$ 5th surface $K = 0.000$
$A_4 = -8.99513 \times 10^{-5}$
$A_6 = 3.06688 \times 10^{-7}$
$A_8 = -7.89909 \times 10^{-9}$
$A_{10} = 5.30177 \times 10^{-11}$ 6th surface $K = 0.000$
$A_4 = -5.91189 \times 10^{-5}$
$A_6 = -1.93342 \times 10^{-7}$
$A_8 = -5.07913 \times 10^{-9}$
$A_{10} = -3.86942 \times 10^{-11}$ 13th surface $K = 0.000$
$A_4 = -6.32605 \times 10^{-4}$
$A_6 = 7.92596 \times 10^{-6}$
$A_8 = -9.82033 \times 10^{-7}$
$A_{10} = 0$ 14th surface $K = 0.000$
$A_4 = 5.81654 \times 10^{-4}$
$A_6 = 1.58228 \times 10^{-5}$
$A_8 = 2.52873 \times 10^{-6}$
$A_{10} = 9.05572 \times 10^{-9}$ 15th surface $K = 0.000$
$A_4 = 9.18061 \times 10^{-4}$
$A_6 = 1.82871 \times 10^{-5}$
$A_8 = 3.83047 \times 10^{-6}$
$A_{10} = 3.18159 \times 10^{-8}$ 23th surface $K = 0.000$
$A_4 = 3.89094 \times 10^{-4}$
$A_6 = 5.94220 \times 10^{-6}$
$A_8 = -4.03564 \times 10^{-7}$
$A_{10} = -3.04291 \times 10^{-8}$ 24th surface $K = 0.000$
$A_4 = 4.72846 \times 10^{-4}$
$A_6 = 9.87695 \times 10^{-6}$
$A_8 = -1.19371 \times 10^{-6}$
$A_{10} = 0$ -continued Zoom data (∞)

| | WE | ST | TE |
|---|---|---|---|
| f (mm) | 5.07 | 11.07 | 24.35 |
| $F_{NO}$ | 3.57 | 3.95 | 5.10 |
| 2ω (°) | 82.06 | 37.58 | 18.28 |
| $d_8$ | 0.62 | 5.37 | 8.61 |
| $d_{13}$ | 8.51 | 3.73 | 0.50 |
| $d_{16}$ | 5.15 | 2.62 | 2.00 |
| $d_{19}$ | 1.20 | 3.76 | 4.35 |
| $d_{22}$ | 1.50 | 2.53 | 6.41 |
| $d_{24}$ | 5.43 | 4.41 | 0.56 |

EXAMPLE 3

| | | | |
|---|---|---|---|
| $r_1 = -171.414$ | $d_1 = 0.80$ | $n_{d1}$ 2.00069 | $\nu_{d1}$ 25.46 |
| $r_2 = 12.360$ | $d_2 = 2.03$ | | |
| $r_3 = \infty$ | $d_3 = 11.0$ | $n_{d2}$ 1.84666 | $\nu_{d2}$ 23.78 |
| $r_4 = \infty$ | $d_4 = 0.20$ | | |
| $r_5 = 42.941$ (Aspheric) | $d_5 = 2.48$ | $n_{d3}$ 1.58913 | $\nu_{d3}$ 61.25 |
| $r_6 = -17.599$ (Aspheric) | $d_6 = 0.10$ | | |
| $r_7 = 15.973$ | $d_7 = 2.27$ | $n_{d4}$ 1.60300 | $\nu_{d4}$ 65.44 |
| $r_8 = -66.903$ | $d_8 = $ (variable) | | |
| $r_9 = -32.405$ | $d_9 = 0.50$ | $n_{d5}$ 1.88300 | $\nu_{d5}$ 40.76 |
| $r_{10} = 10.584$ | $d_{10} = 0.49$ | | |
| $r_{11} = 49.067$ | $d_{11} = 1.78$ | $n_{d6}$ 1.92286 | $\nu_{d6}$ 20.88 |
| $r_{12} = -9.718$ | $d_{12} = 0.50$ | $n_{d7}$ 1.86400 | $\nu_{d7}$ 40.60 |
| $r_{13} = 12.985$ (Aspheric) | $d_{13} = $ (variable) | | |
| $r_{14} = 9.986$ (Aspheric) | $d_{14} = 1.70$ | $n_{d8}$ 1.77377 | $\nu_{d8}$ 47.17 |
| $r_{15} = 93.032$ (Aspheric) | $d_{15} = 0.90$ | | |
| $r_{16} = \infty$ (Stop) | $d_{16} = $ (variable) | | |
| $r_{17} = 17.478$ | $d_{17} = 2.38$ | $n_{d9}$ 1.77250 | $\nu_{d9}$ 49.60 |
| $r_{18} = -7.749$ | $d_{18} = 0.50$ | $n_{d10}$ 1.84666 | $\nu_{d10}$ 23.78 |
| $r_{19} = -20.309$ | $d_{19} = $ (variable) | | |
| $r_{20} = 12.463$ | $d_{20} = 1.90$ | $n_{d11}$ 1.61800 | $\nu_{d11}$ 63.33 |
| $r_{21} = -11.992$ | $d_{21} = 0.48$ | $n_{d12}$ 1.90366 | $\nu_{d12}$ 31.31 |
| $r_{22} = 5.758$ | $d_{22} = $ (variable) | | |
| $r_{23} = 94.554$ (Aspheric) | $d_{23} = 2.53$ | $n_{d13}$ 1.58913 | $\nu_{d13}$ 61.25 |
| $r_{24} = -8.121$ (Aspheric) | $d_{24} = $ (variable) | | |
| $r_{25} = \infty$ | $d_{25} = 0.50$ | $n_{d14}$ 1.51633 | $\nu_{d14}$ 64.14 |
| $r_{26} = \infty$ | $d_{26} = 0.50$ | | |
| $r_{27} = \infty$ | $d_{27} = 0.50$ | $n_{d15}$ 1.51633 | $\nu_{d15}$ 64.14 |
| $r_{28} = \infty$ | $d_{28} = 0.39$ | | |
| $r_{29} = \infty$ (Image Plane) | | | |

Aspherical Coefficients

5th surface $K = 0.000$
$A_4 = -2.40535 \times 10^{-5}$
$A_6 = 3.26252 \times 10^{-9}$
$A_8 = -1.78810 \times 10^{-8}$
$A_{10} = 3.53604 \times 10^{-10}$ 6th surface $K = 0.000$
$A_4 = 2.30715 \times 10^{-6}$
$A_6 = 5.89656 \times 10^{-8}$
$A_8 = -2.10203 \times 10^{-8}$
$A_{10} = 3.56766 \times 10^{-10}$ 13th surface $K = 0.000$
$A_4 = -3.36249 \times 10^{-4}$
$A_6 = 7.37961 \times 10^{-6}$
$A_8 = -5.03569 \times 10^{-7}$
$A_{10} = 0$ 14th surface $K = 0.000$
$A_4 = 7.55392 \times 10^{-4}$ -continued $A_6 = 4.14745 \times 10^{-5}$
$A_8 = -7.71406 \times 10^{-7}$
$A_{10} = 1.34142 \times 10^{-7}$ 15th surface $K = 0.000$
$A_4 = 1.16498 \times 10^{-3}$
$A_6 = 4.46239 \times 10^{-5}$
$A_8 = 4.42626 \times 10^{-7}$
$A_{10} = 2.14083 \times 10^{-7}$ 23th surface $K = 0.000$
$A_4 = 9.85556 \times 10^{-5}$
$A_6 = 7.62351 \times 10^{-6}$
$A_8 = -1.38050 \times 10^{-7}$
$A_{10} = -2.22912 \times 10^{-8}$ 24th surface $K = 0.000$
$A_4 = 2.32658 \times 10^{-4}$
$A_6 = 1.72768 \times 10^{-6}$
$A_8 = -6.21917 \times 10^{-7}$
$A_{10} = 0$ Zoom data (∞)

|  | WE | ST | TE |
|---|---|---|---|
| f (mm) | 5.07 | 11.09 | 25.39 |
| $F_{NO}$ | 3.57 | 3.96 | 5.10 |
| 2ω (°) | 82.00 | 37.51 | 17.55 |
| $d_8$ | 0.62 | 5.96 | 9.70 |
| $d_{13}$ | 9.57 | 4.22 | 0.50 |
| $d_{16}$ | 5.28 | 2.89 | 2.00 |
| $d_{19}$ | 1.20 | 3.59 | 4.46 |
| $d_{22}$ | 1.50 | 2.97 | 7.33 |
| $d_{24}$ | 6.39 | 4.94 | 0.59 |

Figure 4:
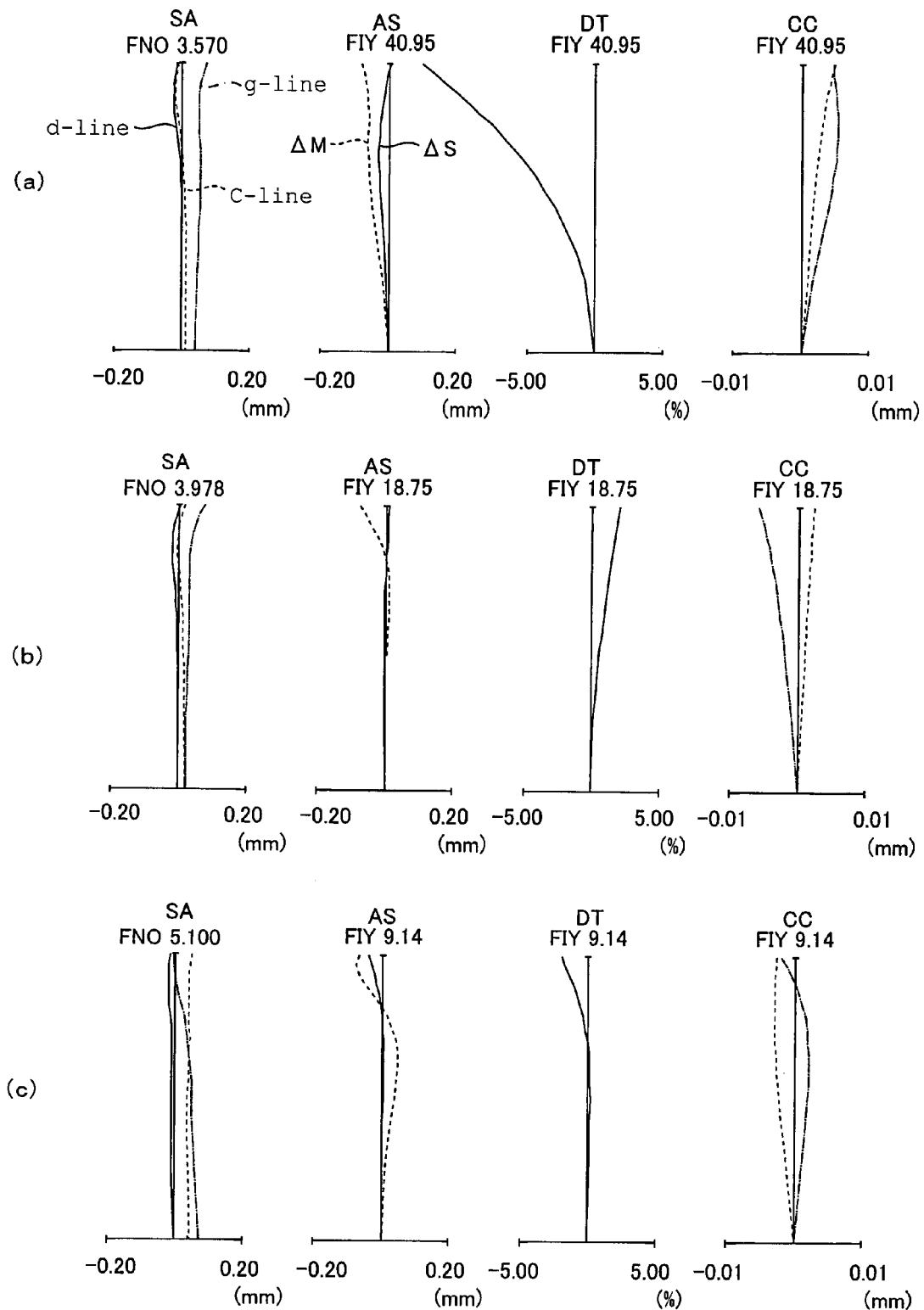
FIGS. 4A, 4B, and 4C are diagrams showing aberration characteristics of the zoom lens of Example 1 at the wide-angle end, in an intermediate state and at the telephoto end (c), respectively, when the zoom lens is focused on an object point at infinity.
Figure 5:
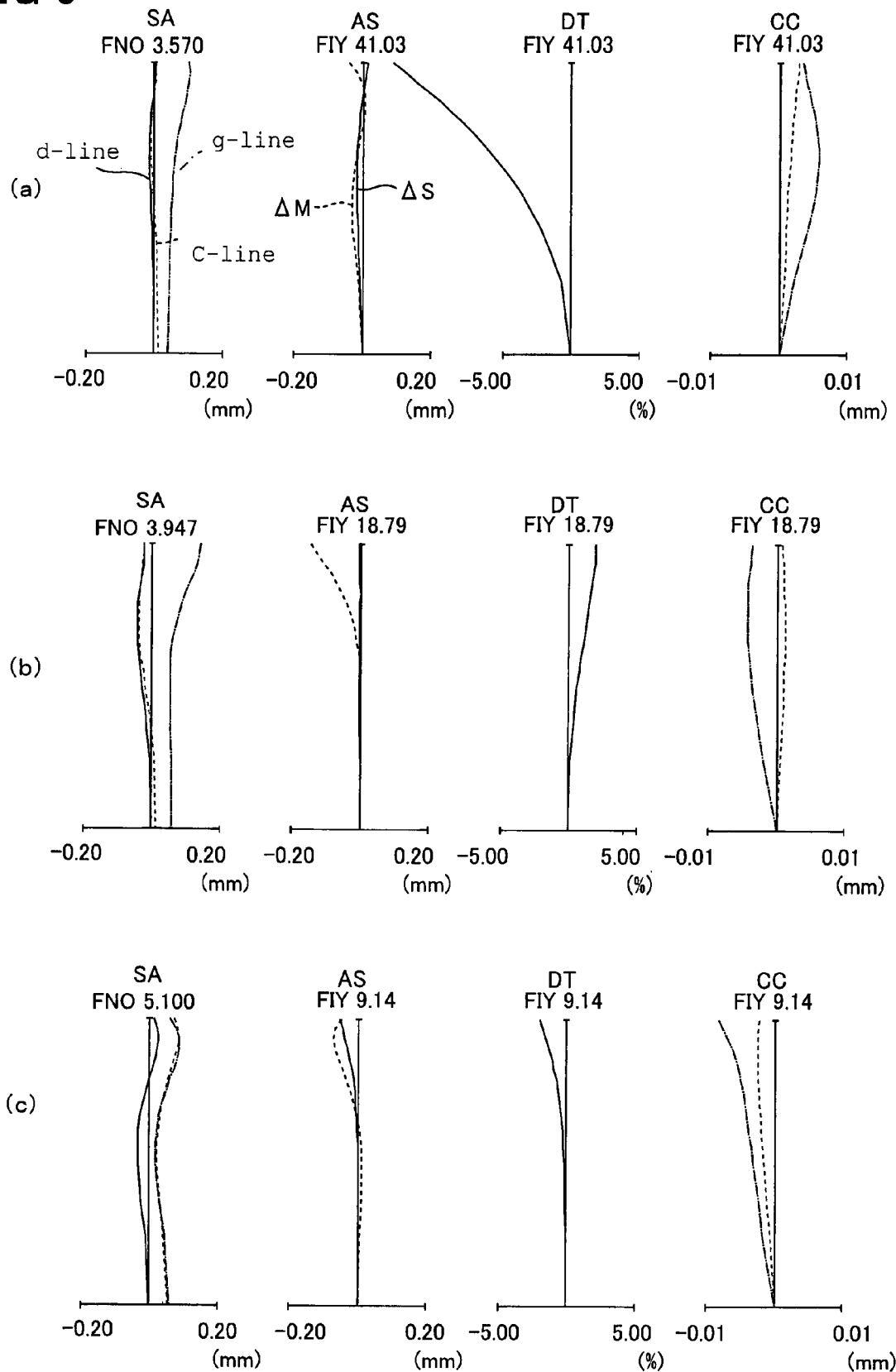
FIGS. 5A, 5B, and 5C are diagrams showing aberration characteristics of the zoom lens of Example 2, similar to FIGS. 4A to 4C.
Figure 6:
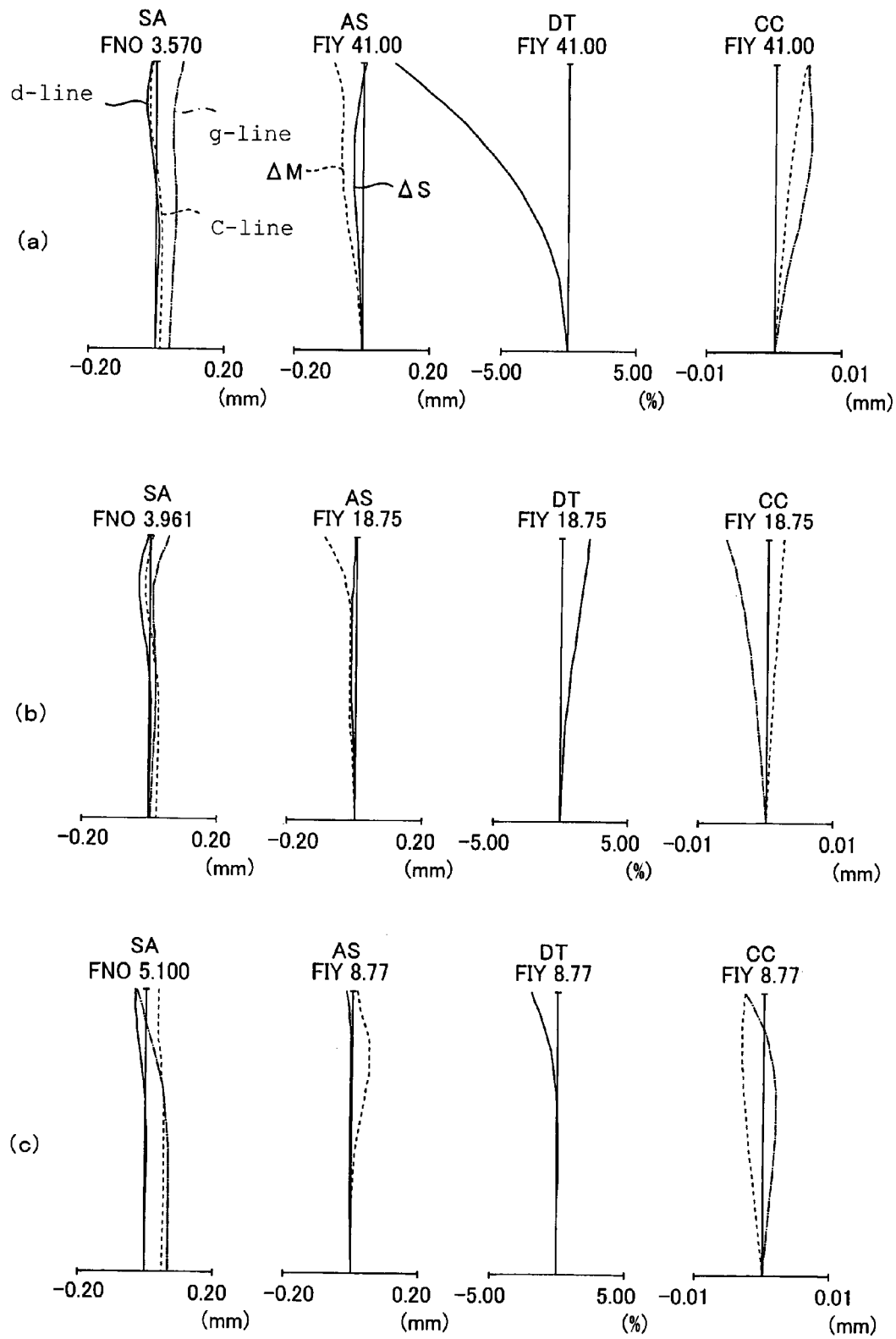
FIGS. 6A, 6B, and 6C are diagrams showing aberration characteristics of the zoom lens of Example 3, similar to FIGS. 4A to 4C.

FIGS. 4 to 6 are diagrams showing aberration characteristics of the zoom lens of Examples 1 to 3, respectively, when the zoom lens is focused on an object point at infinity. Each aberration diagram shows spherical aberration (SA), astigmatism (AS), distortion (DT), and chromatic aberration of magnification (CC) at the wide-angle end (a), in an intermediate state (b), and at telephoto end (c), respectively. In the aberration diagrams, "FIY" denotes half field angle (°).

Values of the conditions (1) to (2) of Examples 1 to 3 described above are described as follows.

| Condition | (1) | (2) |
|---|---|---|
| Example 1 | 2.26 | 2.00069 |
| Example 2 | 2.28 | 2.0017 |
| Example 3 | 2.27 | 2.00069 |

The zoom lens of the present invention described above can be used in a photographing apparatus in which an object image is formed by a focusing optical system in the zoom lens and is received by an image sensor, such as a CCD or silver-halide film, and thereby performing photographing. The above photographing apparatus can widely be applied as a digital camera, a digital terminal device such as a personal computer, a mobile phone, and a PDA (Personal Digital Assistant) incorporating a digital camera or camera, and the like. An embodiment of the photographing apparatus mentioned above will be described below.

Figure 7:
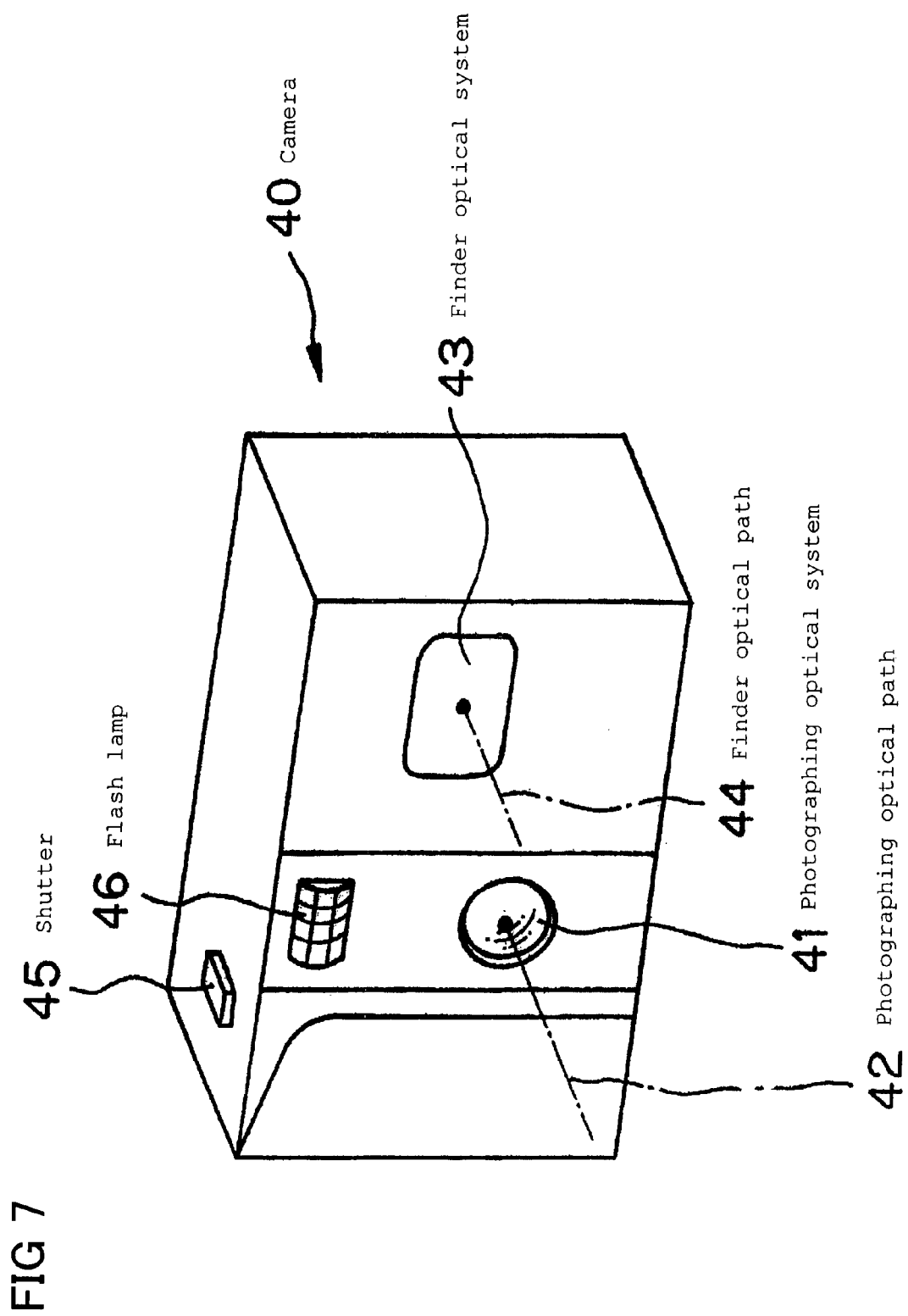
FIG. 7 is a front perspective view of a digital camera incorporating the zoom camera according to the present invention.
Figure 8:
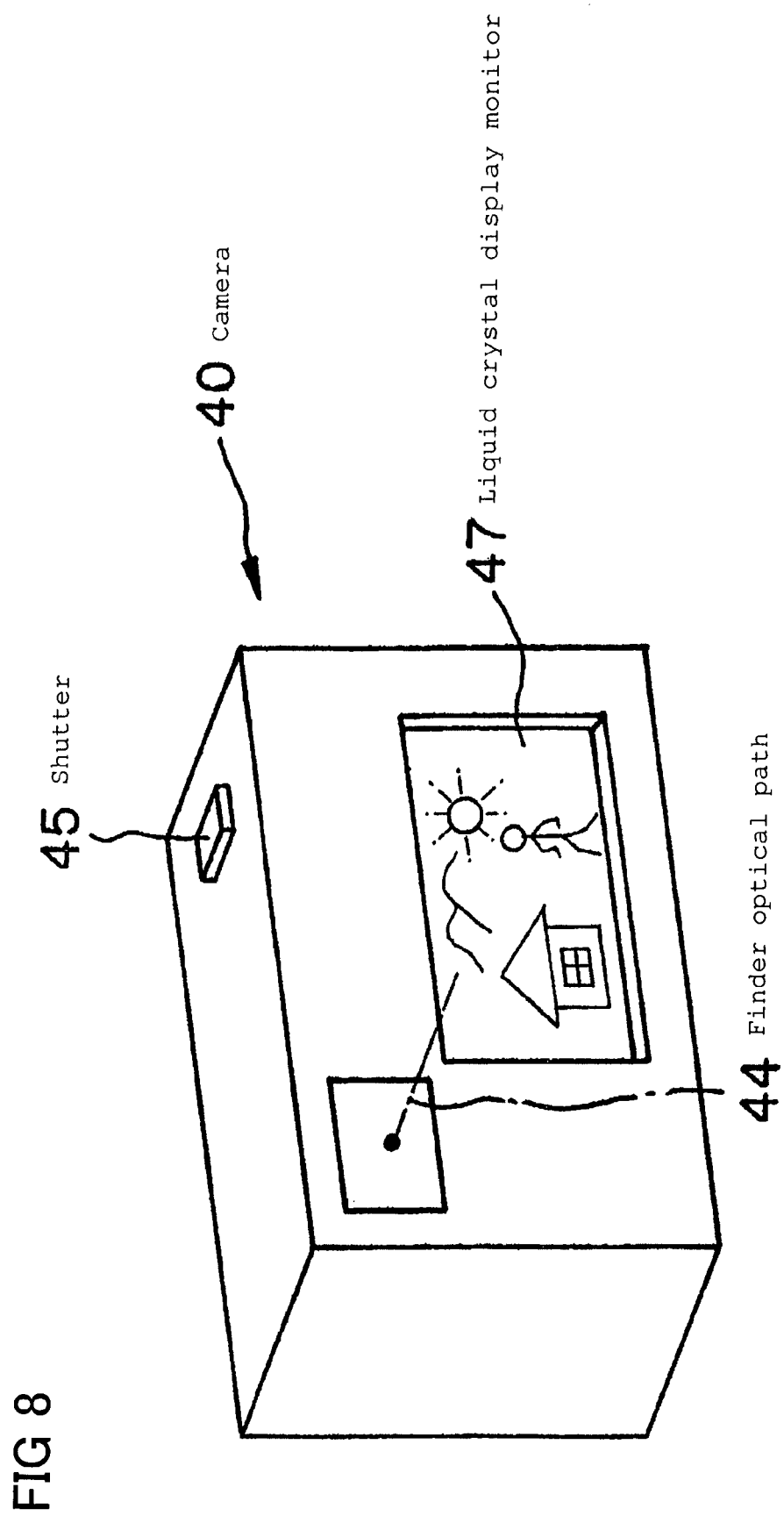
FIG. 8 is a rear perspective view of the digital camera of FIG. 7.
Figure 9:
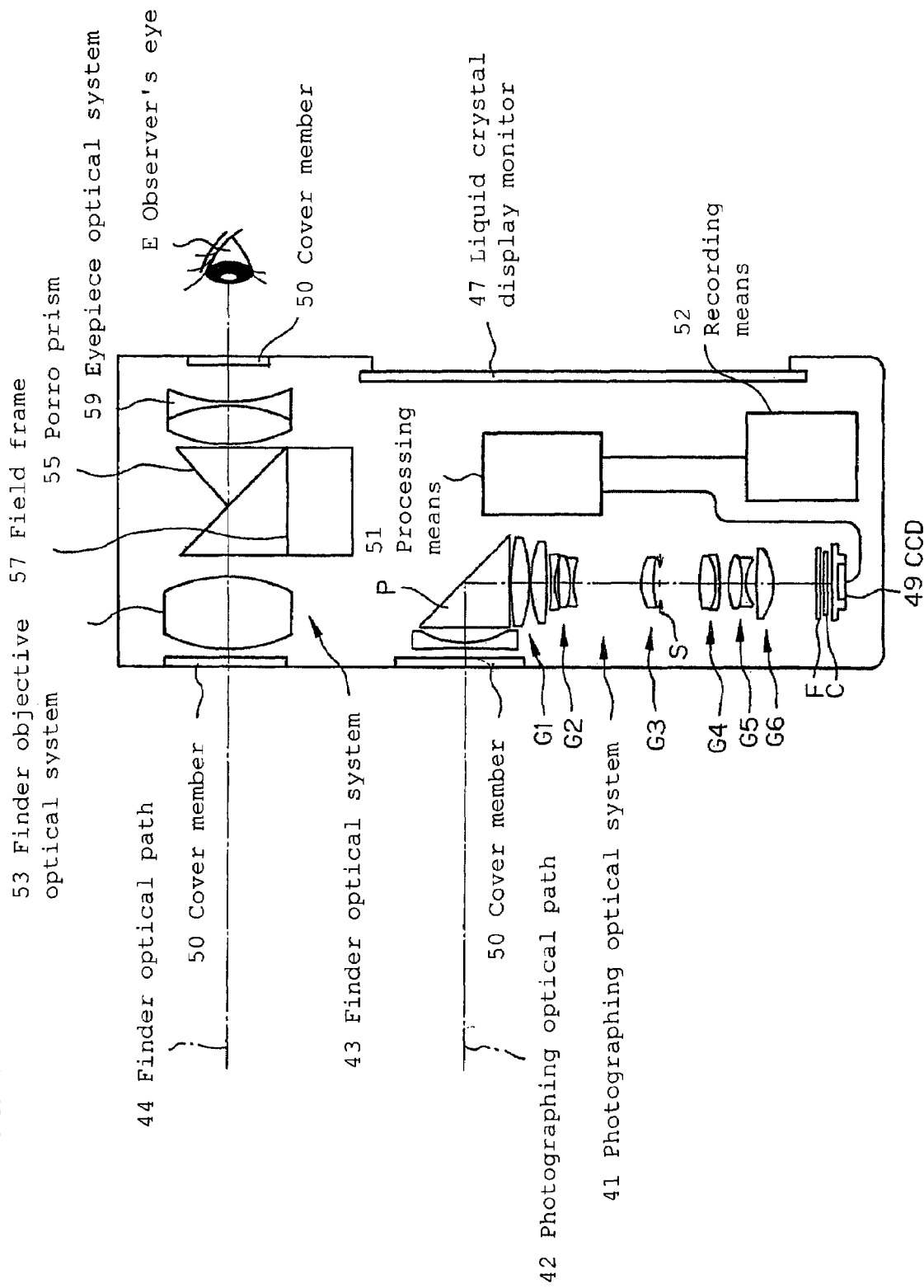
FIG. 9 is a cross-sectional view showing a configuration of the digital camera of FIG. 7.

FIGS. 7 to 13 are conceptual views of a configuration in which the zoom lens of the present invention is incorporated in a photographing optical system 41 of a digital camera. FIG. 7 is a front perspective view of a digital camera 40, FIG. 8 is a rear perspective view thereof, and FIG. 9 is a cross-sectional view showing an internal configuration of the digital camera 40. The digital camera 40, in this example, includes a photographing optical system 41 having a photographing optical path 42; a finder optical system 43 having a finder optical path 44; a shutter 45; a flash lamp 46; a liquid crystal display monitor 47, and the like. When the shutter 45 provided on the upper portion of the camera 40 is depressed, photographing is performed through the photographing optical system 41, e.g., the zoom lens of Example 1, in association with the shutter 45.

An object image produced by the photographing optical system 41 is formed on an imaging surface of an image sensor 49 such as a CCD or CMOS through a near-infrared cut filter and an optical low-pass filter F. The object image received by the image sensor 49 such as a CCD or CMOS is displayed as an electronic image on the liquid crystal display (LCD) monitor 47 provided on the backside of the camera through a processing means (e.g., CPU) 51. A recording means (e.g., memory) 52 can also be connected to the processing means 51 to record a photographed electronic image. The recording means 52 may be provided to be independent of the processing means 51, or may be constructed so that the image is electronically recorded and written, for example, by a floppy (trademark) disk, a memory card, an MO, a DVD±RW, or the like. The camera may be constructed as a film camera using a silver halide film instead of the CCD 49.

A finder objective optical system 53 is located on the finder optical path 44. An object image produced by the finder objective optical system 53 is formed on a field frame 57 through a Porro prism 55 that is an image erecting member. Behind the Porro prism 55 is located an eyepiece optical system 59 that introduces an erect image into an observer's eye E. Also, cover members 50 are placed on the entrance sides of the photographing optical system 41 and the finder objective optical system 53 and on the exit side of the eyepiece optical system 59.

Figure 10:
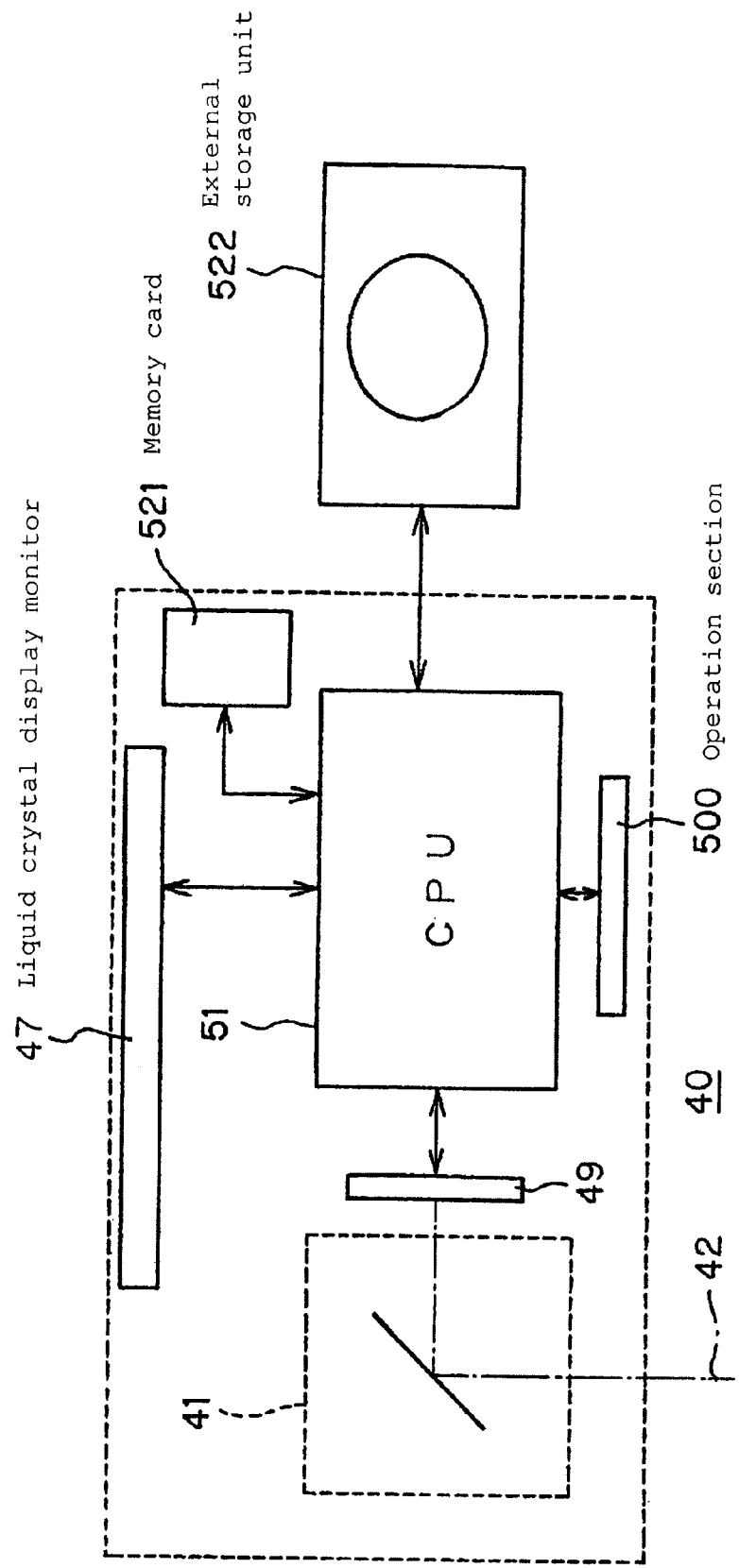
FIG. 10 is a block diagram schematically showing an internal configuration of a main part of the digital camera of FIG. 7.

FIG. 10 is a block diagram schematically showing an internal configuration of a main part of the digital camera 40. In the drawing, an operation section typified by the shutter 45 is indicated by a reference numeral 500, processing means is constituted by a CPU 51, image sensor is constituted by a CCD 49, and recording means are constituted by a memory card 521 and an external storage unit (optical disk or HDD) 522. When the CPU 51 determines that the shutter 45 of the operation section 500 has been depressed, the CPU 51 calculates an optimum shutter control value and aperture control value according to an exposure condition control so as to perform shutter control and aperture control on the basis of the calculated control values. Other control operations are as described above.

In the digital camera 40 constructed as described above, the photographing optical system 41 has a high zoom ratio and a high aberration correction capability. Further, a reduction in size and thickness of the digital camera 40 can be attained.

Although a plane-parallel plate is placed as the cover member 50 in this example of FIG. 9, a lens with power may be used.

In general, a coating for preventing reflection is made to each lens air-interface surface to reduce occurrence of a ghost and flare.

On the other hand, at the cemented surface of the cemented lens component, the refractive index of adhesive is sufficiently higher than that of the air. Therefore, in most cases, the reflectivity at the cemented surface is originally equivalent to or lower than that of single-layer coating, so that it is not necessary to forcedly apply coating. However, positive applying a coating for preventing reflection to the cemented surface further reduces a ghost and flare, thereby obtaining a more satisfactory image.

In particular, a high refractive index glass material, which exhibits a high aberration correction effect, is now in widespread use for a camera optical system. However, when the high refractive glass material is used as a cemented lens component, reflection at the cemented surface cannot be neglected. In such a case, an application of a coating for preventing reflection to the cemented surface is especially effective.

The effective usage of the coating on the cemented surface is disclosed in JP-A-2-27301, JP-A-2001-324676, and JP-A-2005-92115 and U.S. Pat. No. 7,116,428, and the like. These Patent Documents describe particularly about the cemented lens surface coating in a first group of a positive lead zoom lens and, correspondingly, in the present invention, the cemented lens surface coating on the cemented lens component in the first lens group having a positive power may be performed in the manner as disclosed in the above Patent Documents. As a coating material to be used, it is possible to appropriately select, in accordance with the refractive index of an underlying lens and that of adhesive, a coating material having a comparatively high refractive index, such as $Ta_2O_5$, $TiO_2$, $Nb_2O_5$, $ZrO_2$, $HfO_2$, $CeO_2$, $SnO_2$, $In_2O_3$, $ZnO$, or $Y_2O_3$, or a comparatively low refractive index, such as $MgF_2$, $SiO_2$, $Al_2O_3$, and film thickness is set so as to satisfy a phase condition.

As a matter of fact, multi-coating can be applied to the cemented surface as in the case of coating application to the lens air-interface surface. An appropriate combination of two or more layers of coating materials and various film thicknesses can further reduce the reflectivity and control reflectivity spectral characteristics, angular characteristics and the like.

It goes without saying that the cemented surface coating can effectively be applied based on the same concept to cemented surfaces of the lenses other than those of the first lens group.

When the zoom lens of the present invention is used, image distortion is digitally corrected. Here, a description will be given of a fundamental concept for digitally correcting image distortion.

Figure 11:
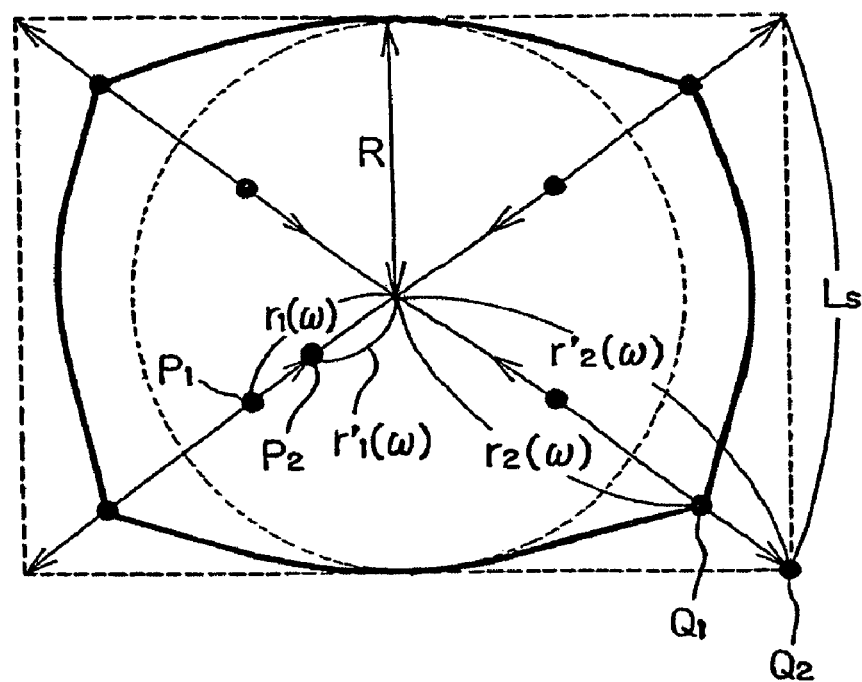
FIG. 11 is a view showing a fundamental conception for digitally correcting image distortion.

For example, as shown in FIG. 11, the magnification on a circle (image height) of a radius R, with an intersection of the optical axis and the imaging surface as a center, coming into contact with the major sides of the effective imaging surface is made constant and this circle is used as a reference of correction. Individual points on circles (image heights) of given radii r (ω) other than the radius R are almost radially moved. In this case, the individual points are moved concentrically so that the radii r (ω) become radii r' (ω). By doing so, the image distortion is corrected. In FIG. 11, for example, a point P1 on the circle of a given radius r1 (ω) located inside the circle of the radius R is moved to a point P2 on the circle of a radius r1' (ω) to be corrected toward the center of the circle. A point Q1 on the circle of a given radius r2 (ω) located outside the circle of the radius R is moved to a point Q2 on the circle of a radius r2' (ω) to be corrected in a direction separating from the center of the circle. Here, the radius r' (ω) can be expressed as follows:

$$r'(\omega) = \alpha f \tan \omega (0 \leq \alpha \leq 1)$$

where ω is half field angle of an object and f is focal length of an imaging optical system (the zoom lens in the present invention).

Here, when an ideal image height corresponding to a point on the circle (the image height) of the radius R is represented by Y, the following relation is obtained:

$$\alpha = R/Y = R/f \tan \omega$$

Ideally, the optical system is rotationally symmetrical about the optical axis. Hence, distortion aberration is also produced rotationally symmetrical about the optical axis. Thus, when distortion aberration optically produced is electrically corrected as described above, the magnification on the circle (the image height) of the radius R, with an intersection of the optical axis and the imaging surface as a center, coming into contact with the major sides of the effective imaging surface is made constant on a reproduced image. Then, individual points on the circles (image heights) of the radii r (ω) other than the radius R are almost radially moved. In this case, the individual points are moved concentrically so that the radii r (ω) become the radii r' (ω). By doing so, when the image distortion can be corrected, it is considered to be advantageous for amounts of data and calculation.

However, an optical image, when picked up by the electronic image sensor, ceases to be continuous (for sampling). Strictly speaking, therefore, unless the pixels of the electronic image sensor are radially arrayed, the circle of the radius R drawn on the optical image ceases to be accurate at all. That is, in the form correction of the image data indicated by individual points of discrete coordinates, there is no pixel corresponding to the circle that the magnification can be made constant. It is thus good practice to use a method of determining coordinates (Xi', Yj') of a moved point in accordance with coordinates (Xi, Yj) of each pixel. In the case where at least two points of the coordinates (Xi, Yj) are moved to the coordinates (Xi', Yj'), the average value of coordinates of pixels is taken. When there is no moving point, it is only necessary that the values of the coordinates (Xi', Yj') of some surrounding pixels are used for interpolation.

Such a method is particularly effective for correction where considerable image distortion is produced with respect to the optical axis because of manufacturing errors of the optical system and the electronic image sensor, and the circle of the radius R drawn on the optical image becomes asymmetrical. This method is also effective for correction where, in the image sensor or various output devices, geometrical distortion is produced when a signal is reproduced as an image.

In order to calculate the amount of correction r' (ω)−r (ω), the electronic imaging apparatus of the present invention may be constructed such that the relationship between the radius r (ω), namely the half field angle and the image height or between a real image height r and an ideal image height r'/α is recorded in a recording medium housed in the electronic imaging apparatus.

Also, in order to obtain an image after correction for distortion in which the amount of light does not suffer a serious shortage at both ends of each minor side, it is favorable that the radius R satisfies the following condition:

$$0 \leq R \leq 0.6 \, Ls$$

where Ls is length of the minor side of the effective imaging surface.

The radius R should preferably satisfy the following condition:

$$0.3 \, Ls \leq R \leq 0.6 \, Ls$$

It is most advantageous that the radius R is made to practically coincide with the radius of a circle coming into contact with the minor sides of the effective imaging surface. Also, when correction is made by holding the magnification constant in the proximity of the radius R=0, namely in axial proximity, the effect of a compact design can be ensured even in a wide-angle design, although somewhat disadvantageous for a substantial number of images.

Also, a focal-length section requiring correction is divided into some focal zones. Correction may be made by the same amount of correction that the result of correction practically satisfying the following relation is obtained in the proximity of the telephoto end within each of divided focal zones:

$$r'(\omega) = \alpha f \tan \omega$$

In this case, however, the amount of barrel distortion remains to some extent at the wide-angle end in each divided focal zone. If the number of divided zones is increased, inherent data required for correction must be excessively stored in the recording medium, which is not very favorable. Thus, one or several coefficients relating to the focal length in each divided focal zone are previously calculated. It is only necessary that such a coefficient is determined on the basis of the measurement by a simulation or actual equipment. The amount of correction is calculated so that the result of correction practically satisfying the following relation is obtained in the proximity of the telephoto end within each divided focal zones:

$$r'(\omega) = \alpha f \tan \omega$$

The amount of correction may be evenly multiplied by the coefficient in accordance with the focal length to obtain the final amount of correction.

When an image obtained by imaging an infinite object is free of distortion, the following relation is established:

$$f = y/\tan \omega$$

(where y is height of an image point from the optical axis (an image height), f is focal length of an imaging optical system (the zoom lens in the present invention), and ω is angle (a half field angle of the object) made by a direction of an object point corresponding to an image point, connecting the center of the effective imaging surface and the position of the image height y, with the optical axis).

When barrel distortion is produced in the imaging system, the following condition is set:

$$F > y/\tan \omega$$

That is, when the focal length f and the image height y are made constant, the value of ω becomes large.

Figure 12:
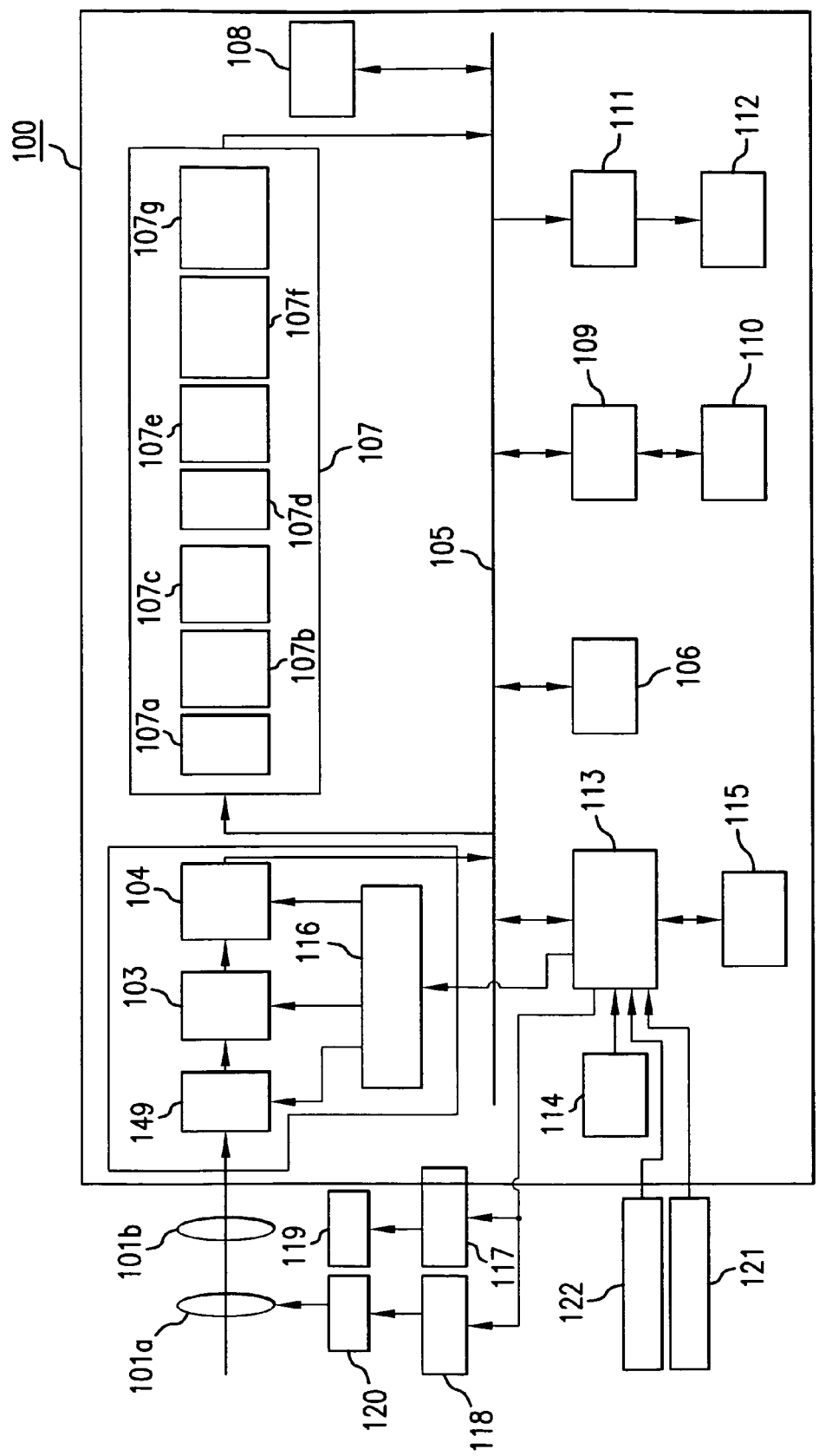
FIG. 12 is a view showing a configuration of an internal circuit of a main part of a digital camera according to another embodiment which incorporates an optical path-bending zoom optical system.

FIG. 12 is a block diagram showing another embodiment of the digital camera of FIG. 7. The camera 40 includes an image sensor 149, a CDS/AGC circuit 103, an A/D converter 104, a bus 105, an SDRAM 106, an image processor 107, a JPEG processor 108, a memory I/F 109, a recording medium 110 which is a part of the recording means 52, an LCD driver 111, an LCD 112 used as the liquid crystal display monitor 47, a microcomputer (CPU) 113, an operation section 114, and a Flashmemory 115.

The image sensor 149 has a Bayer-arrangement color filters which are disposed on the front surface of the respective pixels formed by a photodiode. When an imaging driving circuit 116 is activated based on an instruction from the microcomputer (CPU) 113, it starts controlling the CDS/AGC circuit 103 constituted by a CDS (Correlated Double Sampling) circuit for reducing a noise component and an AGC (Automatic Gain Control) circuit for stabilizing a signal level and A/D converter 104 for converting an analog electrical signal into a digital electrical signal.

The image sensor 149 uses a photodiode constituting each pixel to receive an object image produced through the photographing optical system 41. In FIG. 12, the photographing optical system 41 is represented by two parts (101a and 101b). The first part 101a corresponds to the first to fourth lens groups G1 to G4 and second part 101b corresponds to the fifth and sixth lens groups G5 and G6. In this example, the fifth and sixth lens groups G5 and G6 perform focusing and first to fourth lens groups G1 to G4 perform most of the zooming functions. Therefore, the first part 101a is referred to as a zooming section and second part 101b is referred to as a focusing section. The received optical image is photoelectrically converted by the image sensor 149, whereby the light amount is converted into a charge amount. This charge amount is then output to the CDS/AGC circuit 103. The Bayer arrangement is a pixel arrangement in which horizontal rows including alternating R (Red) and G (Green) pixels and horizontal rows including alternating G (Green) and B (Blue) pixels are alternately arranged in the vertical direction. The image sensor 149 may be a CMOS type image sensor or CCD image sensor. Although not shown, the imaging driving circuit 116 including a timing generator for driving the image sensor, CDS/AGC circuit 103, and A/D converter 104 are constituted by an AFE (Analog Front End circuit) IC.

It is assumed that the image sensor 149 can operate in a plurality of modes including, at least, a pixel addition readout mode and all-pixel readout mode. The pixel addition readout mode is an operation mode in which the charges of a plurality of adjacently disposed pixels are added followed by readout of added charges. The all-pixel readout mode is an operation mode in which all charges are read out from effective pixels in the image sensor.

The CDS/AGC circuit 103 performs reset noise removal and waveform shaping for an electric signal (analog image signal) read out from the image sensor 149 and, further, executes gain-up so that the brightness of an image becomes a target brightness level. The A/D converter 104 converts an analog image signal pre-processed by the CDS/AGC circuit 103 into a digital image signal (hereinafter, referred to as "image data").

The bus 105 is a transmission path for transmitting various data generated in the inside of the camera to respective sections in the camera and is connected to the A/D converter 104, SDRAM 106, image processor 107, JPEG processor 108, memory I/F 109, LCD driver 111, and CPU 113. The image data obtained by the A/D converter 104 is temporarily stored in the SDRAM 106 through the bus 105. The SDRAM 106 is a storage for temporarily storing the image data obtained by the A/D converter 104 and other various data such as image data to be processed in the image processor 107 and JPEG processor 108.

The image processor 107 reads out the image data stored in the SDRAM 106 and performs gain control and image processing for the read image data. The image processor 107 includes a white balance (WB) correction circuit 107a, a synchronization circuit 107b, color conversion/color reproduction circuit 107c, a γ conversion circuit 107d, an edge extraction circuit 107e, a noise reduction circuit 107f, and an interpolation resizing circuit 107g.

The WB correction circuit 107a performs white balance correction by multiplying R data and B data of the image data read out from the SDRAM 106 by a white balance gain specified by the CPU 113. The synchronization circuit 107b generates, from the image data output from the WB correction circuit 107a, image data having three colors R, G, and B as one pixel component. The color conversion/color reproduction circuit 107c performs linear conversion to multiply the image data output from the synchronization circuit 107b by a color matrix specified by the CPU 113 to thereby correct the color of the image data and uses a color saturation/hue coefficient specified by the CPU 113 to change the color of the image by calculation. The γ conversion circuit 107d applies γ conversion (gradation conversion) to the image data output from the color conversion/color reproduction circuit 107c to correct the gradation of the image data for display or printing.

The edge extraction circuit 107e uses a BPF (Band Pass Filter) coefficient specified by the CPU 113 to extract an edge component in the image data. The noise reduction circuit 107f serving as a flatness portion information extraction section and noise reduction section applies filtering processing to the image data using filter parameters specified by the CPU 113 to reduce noise in the image data. The interpolation resizing circuit 107g performs interpolation processing to the image data and performs resizing processing for adjusting the output size of the image data.

The image data that has been subjected to the image processing as described above by the image processor 107 is stored once again in the SDRAM 106.

The JPEG processor 108 reads out, from the SDRAM 106, the image data that has been subjected to the image processing and compresses the image data according to JPEG specification. The JPEG processor 108 also has a function of reading out JPEG compressed data recorded in the recording medium 110 and decompressing the compressed data. The image data compressed by the JPEG processor 108 is once stored in the SDRAM 106 and then recorded in the recording medium 110 through the memory I/F 109. Although not limited to this, it is possible to use, e.g., a memory card detachably attached to the camera body as the recording medium 110.

The LCD driver 111 has a function of displaying an image on the LCD 112. In the case where JPEG compressed image data recorded in the recording medium 110 is displayed, the JPEG compressed image data recorded in the recording medium 110 is read out and subjected to decompression by the JPEG processor 108 and then once stored in the SDRAM 106. The LCD driver 111 reads out the image data from the SDRAM 106 and converts the image data into an image signal so as to display the image data on the LCD 112. The CPU 113 serving as a simultaneous photographing section and a noise reduction determination section exercises a comprehensive control over various sequences performed in the camera body. The operation section 114 and Flashmemory 115 in which a camera program and focus lens position data are stored are connected to the CPU 113. The operation section 114 includes various types of operation elements such as a power button, a release button, and various input keys. In response to a user's operation on the operation section 114, the CPU 113 executes various sequences corresponding to the user's operation. The Flashmemory 115 is a storage for storing various parameters such as the white balance gain, color matrix, and filter parameters. The CPU 113 reads parameters required for executing various sequences from the Flashmemory 115 and issues instructions to the respective sections. A reference sensor 122 is a sensor for determining whether the focus lens 101b is situated at a reference position. A temperature sensor 121 detects temperature and notifies the CPU 113 of the detection result.

The operation section 114 includes various buttons and switches for receiving various instructions from a photographer and notifies the CPU 113 of the instructions. Concretely, the operation section 114 includes, e.g., a release button for instructing the start of photographing operation, a focal length change button, a setting change switch, and the like. In accordance with the characteristics of the camera, it is possible to provide other various operation buttons such as a focus mode switching button for switching a focus mode between AF (Auto Focus) mode and MF (Manual Focus) mode, an MF driving button for instructing the movement of the focusing section 101b when the MF mode is selected, a preset button for instructing storage of data situated at the position of the focusing section 101b, a preset value readout button for instructing readout of the stored data situated at the position of the focusing section 101b, and an infinity button for instructing movement of the focusing section 101b to the infinite focusing position in accordance with a lens zooming state.

The CPU 113 executes a camera program previously stored in the Flashmemory 115 to thereby control the entire operation of the electronic camera. For example, the CPU 113 executes AF processing (contrast AF processing) based on the contrast of an object image.

A zooming motor 120 receives an instruction from the CPU 113 through a zoom controller 118 constituted by a drive circuit and drives the zoom section 101a. A focusing motor 119 receives an instruction from the CPU 113 through a focus controller 117 constituted by a drive circuit and drives the focusing section 101b. The focusing section 101b is driven by the focusing motor 119 both in the AF and MF modes.

Figure 13A:
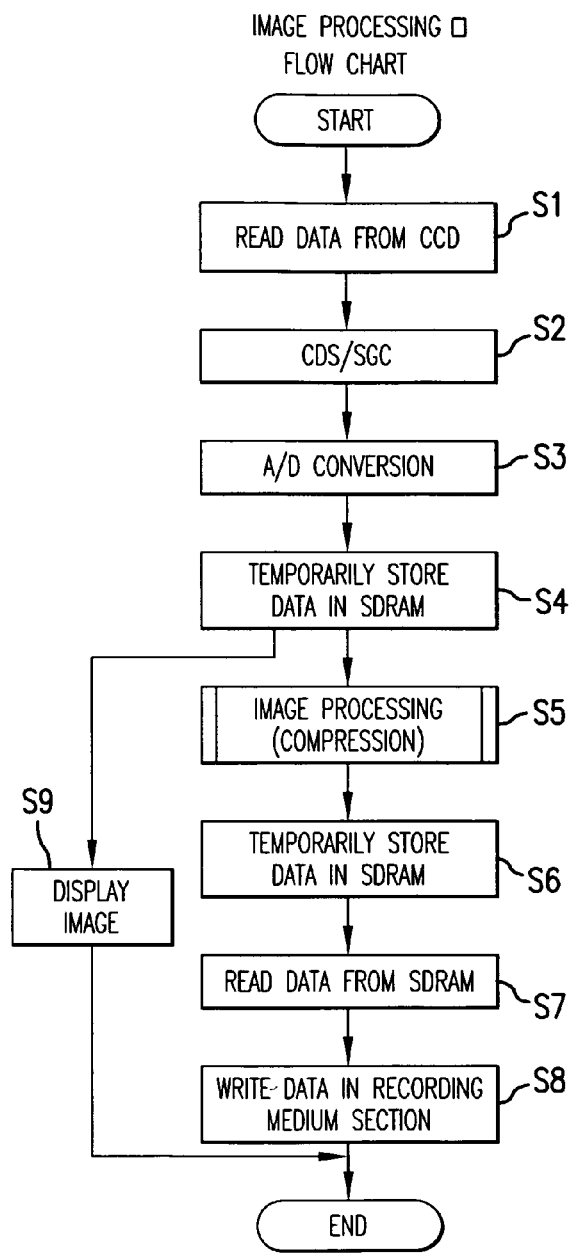
FIGS. 13A and 13B are flowcharts showing image save processing and image display processing.
Figure 13B:
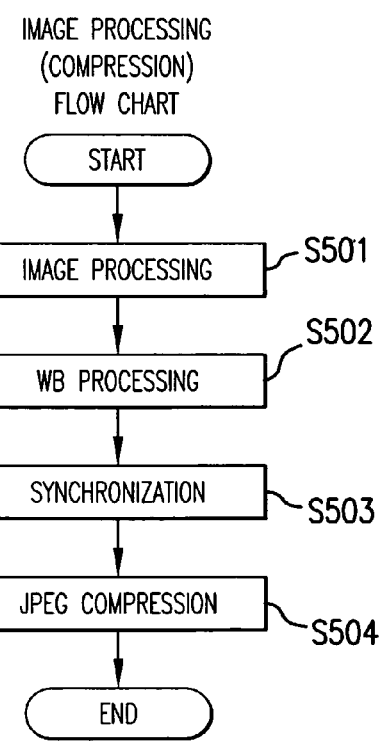

FIGS. 13A and 13B are flowcharts showing image save processing and image display processing. The CPU 113 controls the operation of the image save processing and image display processing according to an operation program stored in the Flashmemory 115.

Hereinafter, the flowcharts of FIGS. 13A and 13B will be described. As shown in FIG. 13A, in step S1, the image sensor uses a photodiode constituting each pixel to receive an object image produced through the photographing optical system (zoom lens 101a and focus lens 101b).

In step S2, the CDS/AGC circuit 103 performs reset noise removal and waveform shaping for an electric signal (analog image signal) read out from the image sensor 149 and, further, executes gain-up so that the brightness of an image becomes a target brightness level. Subsequently, in step S3, the A/D converter 104 converts an analog image signal pre-processed by the CDS/AGC circuit 103 into a digital image signal (hereinafter, referred to as "image data"). The image data obtained in the A/D conversion process (S3) is temporarily stored in the SDRAM 106 through the bus 105 in step S4. Similarly, the LCD driver 111 reads out the image data from the SDRAM 106 in step S4 and converts the image data into an image signal so as to display the image data on the LCD 112 in step S9.

As shown in FIG. 13B, the image processing (compression) (S5) includes an image processing step (S501), a WB processing step (S502) of performing white balance correction by multiplying R data and B data of the image data read out from the SDRAM 106 by a white balance gain specified by the CPU 113, a synchronization step (S503) of generating image data having three colors R, G, and B as one pixel component, and a JPEG compression step (S504) of compressing the image data.

In step S6, various data such as image data that have been processed in the image processing step (S5) (from image processing step (S501) to synchronization step (S503)) are temporarily stored.

Then, a JPEG processing step (S504) is performed to read out JPEG compressed data recorded in the recording medium 110. The image data compressed in the JPEG processing step (S504) is once stored in the SDRAM 106, then recorded in the recording medium 110 through the memory I/F 109 in step S8, and the processing flow is ended.

An example of a camera program stored in the Flash-memory 115 will be described.

Figure 14A:
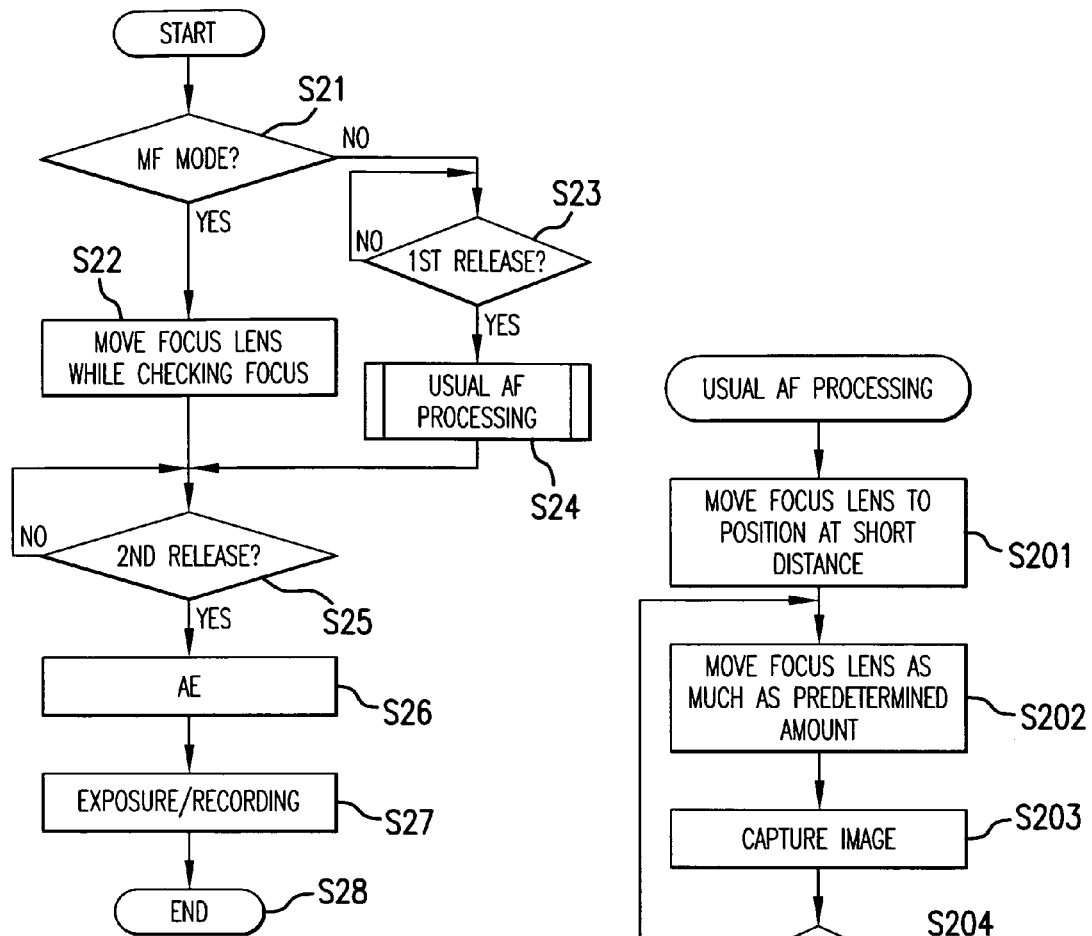
FIGS. 14A and 14B each are an example of a flowchart showing a processing procedure executed when a focus lens of a focusing section is preset to an infinite focusing position (position corresponding to infinity).
Figure 14B:
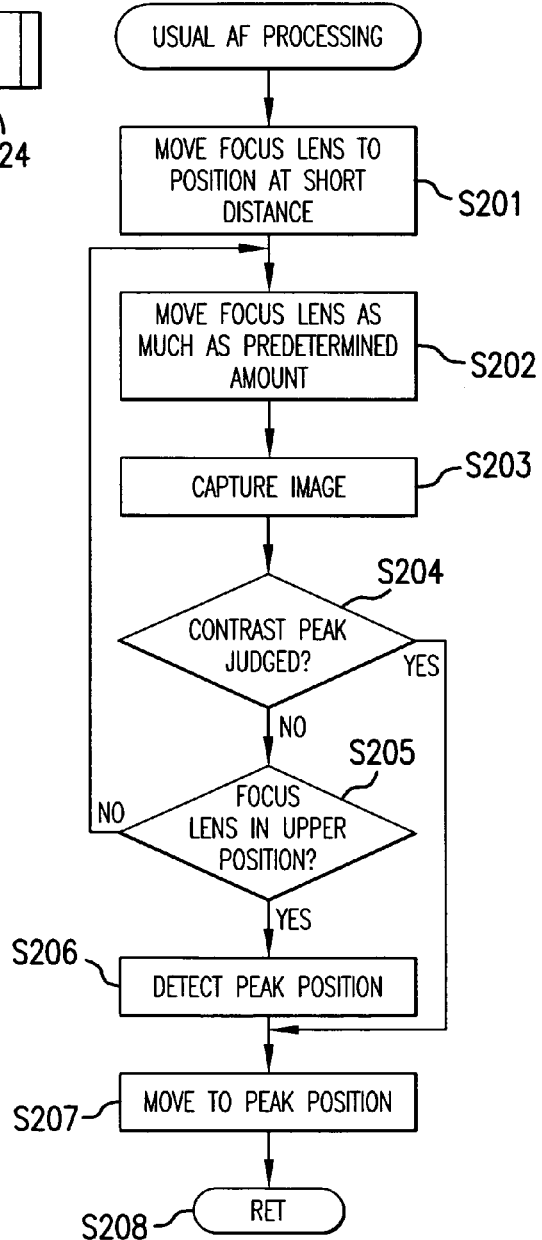

FIGS. 14A and 14B each are an example of a flowchart showing a processing procedure executed when the focus lens of the focusing section is preset to an infinite focusing position (position corresponding to infinity). First, a power is turned on and initialization processing is performed. In the initialization processing, if no position data is stored in the memory, the zoom lens and focus lens are restored to a reference position and data in the memory is initialized. Referring to FIG. 14A, in step 21, it is determined whether the current focus mode is the MF mode. When the determination result is "Yes", the processing flow proceeds to step S22 while when the determination result is "No", the processing flow proceeds to step S23. As described above, the focus mode (MF mode or AF mode) is selected by a photographer's operation to the focus mode switching button.

In step S23, a release button is operated and it is determined whether the release button has been depressed down to a first release position. When the determination result is "Yes", the processing flow proceeds to step S24 while when the determination result is "No", step S23 is repeated. In step S24, usual AF processing according to the contrast AF method is performed as shown in FIG. 14B.

In step S25, it is determined whether the release button has been depressed down to a second release position to issue a photographing start instruction. When the determination result is "Yes", the processing flow proceeds to step S26 while when the determination result is "No", step S25 is repeated. In step S26, AE processing is performed to determine an exposure condition (shutter speed, aperture value, and the like). In step S27, exposure is performed based on the exposure condition determined in step S26. That is, an object image imaged based on the exposure condition is photoelectrically converted by the CCD, and the abovementioned processing is performed by the image processor, whereby image data which is a digital electrical signal is obtained. Finally, predetermined image processing such as compression processing is applied to the obtained image data, the resultant data is stored in a memory card, and this processing flow is ended.

Referring to FIG. 14B, in step S201, the focus lens is moved to a lower limit position.

In step S202, the focus lens is moved toward an upper limit position by a predetermined unit amount.

In step S203, a predetermined area of the object image imaged on the image sensor is captured, and the contrast value thereof is obtained.

In step S204, it is determined whether there is a contrast peak within the movement from the lower limit position to the current position. When the determination result is "Yes", the processing flow proceeds to step S207 while when the determination result is "No", the processing flow proceeds to step S205. As described above, when it is determined that there clearly exists a contrast peak within the area from the lower limit position to upper limit position (to be described later), the focus lens position at which the contrast peak is detected is set as the focusing point to thereby shorten the time required to detect the focusing position.

In step S205, it is determined whether the focus lens is situated at an upper limit position. When the determination result is "Yes", the processing flow proceeds to step S206 while when the determination result is "No", the processing flow returns to step S202.

In step S206, in the case where a contrast peak has not been found in step S204, a focus lens position at which the contrast value is highest, that is, a focus lens position exhibiting a contrast peak value is obtained from contrast values obtained, in step S203, with the focus lens moved from the lower limit position toward upper limit position by a predetermined unit amount.

In step S207, the focus lens is moved to the focus lens position exhibiting a contrast peak value obtained in step S206, and the processing flow of FIG. 14B returns to step S25 of the flowchart of FIG. 14A. In step S25, it is determined whether the release button has been depressed down to the second release position. When the determination result is "Yes", the processing flow proceeds to step S26 while when the determination result is "No", step S25 is repeated.

What is claimed is:

1. A zoom lens comprising, in order from the object side, a first lens group with a positive power, a second lens group with a negative power, a third lens group with a positive power, a fourth lens group with a positive power, a fifth lens group with a negative power, and a sixth lens group with a positive power, wherein upon zooming from a wide-angle end to telephoto end, the first lens group remains fixed relative to an image surface and at least second and fourth lens groups move, the first lens group comprises, in order from the object side, a negative lens, a reflecting optical element for bending an optical path, and a positive lens, and the following conditional expression is satisfied:

$$1.0 < |f_{1L1}|/f_w < 2.5 \quad (1)$$

where $f_{1L1}$ is focal length of the negative lens in the first lens group, and $f_w$ is focal length at the wide-angle end;

wherein the third lens group remains fixed upon zooming; and wherein the first lens group comprises, in order from the object side, a negative lens, a prism, a positive lens, and a positive lens.

2. The zoom lens according to claim 1, wherein the following conditional expression is satisfied:

$$N_{dL1} > 1.94 \quad (2)$$

(where $N_{dL1}$ is refractive index of the negative lens in the first lens group).

3. The zoom lens according to claim 1, wherein at least one surface of the lenses of the second lens group is aspheric.

4. The zoom lens according to claim 1, wherein the second lens group comprises, in order from the object side, a negative lens and a cemented lens component, wherein the cemented lens component includes positive and negative lenses.

5. The zoom lens according to claim 1, wherein the negative lens of the first lens group has an aspheric surface.

6. An imaging apparatus comprising the zoom lens as claimed in claim 1 and an image sensor disposed on the image side of the zoom lens.

7. The imaging apparatus according to claim 6, wherein a low pass filter is disposed between the zoom lens and image sensor.

8. A method of recording a photographed image, comprising:

receiving an image produced by the zoom lens as claimed in claim 1 by an image sensor;

retaining an image signal output from the image sensor;

A/D converting the image signal after gain control;

storing the A/D converted image signal in a memory;

applying image compression to the image signal read out from the memory; and recording the compressed image signal in a recording medium.

9. A method of recording a photographed image, comprising:

receiving an image produced by the zoom lens as claimed in claim 1 by an image sensor;

retaining an image signal output from the image sensor;

A/D converting the image signal after gain control;

storing the A/D converted image signal in a memory; and reading out the image signal from the memory so as to display the read out image signal on a display unit.

10. An imaging method in an imaging apparatus having an auto-focus process in which auto-focus control having an AF processing function is performed based on the contrast of an object image and a manual-focus process in which focus control is manually performed, comprising:

selecting the auto-focus process or manual-focus process, determining whether photographing start instruction has been issued through a photographing operation section;

determining an exposure condition in response to the photographing start instruction; and receiving an object image produced by the zoom lens as claimed in claim 1 by an image sensor based on the determined exposure condition.

* * * * *